(12) United States Patent
Finkleman

(10) Patent No.: US 10,712,056 B2
(45) Date of Patent: Jul. 14, 2020

(54) SOLAR COOLING SYSTEM

(71) Applicant: SOLAR SNOW CORPORATION, Calgary (CA)

(72) Inventor: Harold Finkleman, Calgary (CA)

(73) Assignee: Solar Snow Corporation, Calgary (CA)

( * ) Notice: Subject to any disclaimer, the term of this patent is extended or adjusted under 35 U.S.C. 154(b) by 731 days.

(21) Appl. No.: 15/067,765

(22) Filed: Mar. 11, 2016

(65) Prior Publication Data

US 2016/0195313 A1   Jul. 7, 2016

Related U.S. Application Data

(63) Continuation of application No. PCT/CA2014/050865, filed on Sep. 12, 2014.
(Continued)

(51) Int. Cl.
*F25B 27/00* (2006.01)
*F25B 21/02* (2006.01)
(Continued)

(52) U.S. Cl.
CPC .......... *F25B 27/002* (2013.01); *F24F 5/0007* (2013.01); *F24S 23/74* (2018.05);
(Continued)

(58) Field of Classification Search
CPC ...... F25B 27/002; F25B 27/007; F25B 15/00; F25B 15/10; F25B 21/02; F25B 35/00; F25B 39/00; F25B 39/02; F25B 2315/00; F24F 5/0007; F24F 5/001; F24F 5/0014; F24F 5/0042; F24F 2005/0064; F24S 23/74; Y02A 30/277; Y02A 30/62; Y02E 10/45
(Continued)

(56) References Cited

U.S. PATENT DOCUMENTS 1,781,541 A   11/1930   Einstein et al.
4,327,555 A   5/1982   Dimon
(Continued)

FOREIGN PATENT DOCUMENTS

CN   2530220 Y   1/2003
CN   101611498 A   12/2009
(Continued)

OTHER PUBLICATIONS

International Search Report, PCT/CA2014/050865, dated Dec. 19, 2014, 4 pages.
(Continued)

*Primary Examiner* — Joseph F Trpisovsky
(74) *Attorney, Agent, or Firm* — Stinson LLP

(57) ABSTRACT

Some aspects of the invention provide an air cooling system. The air cooling system may include a solar energy gathering component that drives a cooling system. The air cooling system may include an absorption cooling system or a thermoelectric cooling system. The cooling system may include a solar collector matched with an air venting system. The cooling unit may hang on the inside of a window or on another vertical surface and utilize the heat and/or radiation from the sun to activate a cooling mechanism that, in turn, provides cooling via the cooling system.

34 Claims, 31 Drawing Sheets

Related U.S. Application Data

(60) Provisional application No. 61/877,001, filed on Sep. 12, 2013.

(51) Int. Cl.
| | | |
|---|---|---|
| *F24F 5/00* | (2006.01) | |
| *F25B 15/10* | (2006.01) | |
| *F24S 23/74* | (2018.01) | |
| *F25B 15/00* | (2006.01) | |
| *F25B 15/04* | (2006.01) | |
| *F25B 35/00* | (2006.01) | |
| *F25B 39/00* | (2006.01) | |
| *F25B 39/02* | (2006.01) | |

(52) U.S. Cl.
CPC .............. *F25B 15/00* (2013.01); *F25B 15/04* (2013.01); *F25B 15/10* (2013.01); *F25B 21/02* (2013.01); *F25B 27/007* (2013.01); *F25B 35/00* (2013.01); *F25B 39/00* (2013.01); *F24F 5/001* (2013.01); *F24F 5/0014* (2013.01); *F24F 5/0042* (2013.01); *F24F 2005/0064* (2013.01); *F25B 39/02* (2013.01); *F25B 2315/00* (2013.01); *Y02A 30/277* (2018.01); *Y02B 30/62* (2013.01); *Y02E 10/45* (2013.01)

(58) Field of Classification Search
USPC ........................................................ 62/235.1
See application file for complete search history.

(56) References Cited

U.S. PATENT DOCUMENTS

| 8,701,423 | B2 | 4/2014 | Daniels | |
|---|---|---|---|---|
| 2008/0078185 | A1 | 4/2008 | Cao | |
| 2008/0203965 | A1 | 8/2008 | Katoh et al. | |
| 2011/0016906 | A1* | 1/2011 | Zuili | F24F 5/0014 62/440 |
| 2011/0214712 | A1* | 9/2011 | Frazier | H02S 30/20 136/248 |
| 2012/0011865 | A1* | 1/2012 | Ivison | B01D 5/0015 62/79 |
| 2012/0017621 | A1* | 1/2012 | Andrews | F25B 15/04 62/235.1 |
| 2012/0312039 | A1* | 12/2012 | Rothfuss | F24F 13/18 62/119 |

FOREIGN PATENT DOCUMENTS

| CN | 201373518 Y | 12/2009 |
|---|---|---|
| CN | 103673137 A | 3/2014 |

OTHER PUBLICATIONS

Written Opinion, PCT/CA2014/050865, dated Dec. 19, 2014, 6 pages.
"Energor Technology Co., Ltd" Feb. 10, 2013, <https://web.archive.org/web/20130210052549/http://www.energor.com/Solarair.html>.
Abstract of CN2530220Y; Jan. 8, 2003.
Abstract of CN201373518; Dec. 30, 2009.
Office Action, Chinese Application No. 201480061732.X, dated Jun. 5, 2018, 10 pages.

\* cited by examiner

SOLAR COOLING SYSTEM

REFERENCE TO RELATED APPLICATIONS

The present application is a continuation application based on and claiming priority to PCT/CA2014/050865 filed Sep. 12, 2014, and also claims priority to U.S. Provisional Patent Application Ser. No. 61/877,001, filed Sep. 12, 2013, the entire contents of which are incorporated by reference.

FIELD OF THE INVENTION

The present invention relates to solar-powered thermal cooling systems for indoor cooling applications.

BACKGROUND

In many parts of the world the electricity costs are high and/or electricity supply is unreliable, which means that in many cases conventional air cooling systems that are compressor based and electrically powered are expensive to operate and/or unreliable due to electrical power outages. For example, much of Asia spends more energy cooling buildings than it spends on lighting and heating combined.

In the North American and European markets, where rising summer temperatures result in large numbers of people switching on conventional air cooling units, the increasingly common consequence is electrical power outages due to the increasing demand on the electrical distribution system, leaving homes and businesses without cooling alternatives. Heat issues are truly global. Even in the United States, heat waves kill more people than all other natural disasters or weather encounters combined.

In addition, in many cases the electricity supply is generated by coal-fired power plants or nuclear power plants, which have associated environmental and public safety concerns.

SUMMARY OF THE INVENTION

Some aspects of the invention provide a solar collector matched with an air venting system that may hang on the inside of windows (or on a wall or other vertically oriented surface) and utilize the heat and/or radiation from the sun to activate a cooling mechanism or cooling element that, in turn, provides cooling.

Some aspects of the invention, which may be embodied in several different configurations, comprise a solar collector matched to an air venting system that utilizes the heat and/or radiation of the sun to activate cooling mechanisms that, in turn, provide the cooling that is vented.

Just as there are different styles of collectors and venting systems being used, there are a variety of different types of cooling mechanisms that may be implemented in the various configurations of embodiments of the invention.

According to one aspect of the disclosure there is provide an air cooling system comprising: a cooling element configured to generate cooling when driven by energy; and a solar energy gathering component configured to generate energy to drive the cooling element to generate cooling, wherein at least one of the cooling element and the solar energy gathering component are adapted to be suspended.

In some embodiments the cooling element and the solar energy gathering component are integrated to form a cooling unit.

In some embodiments the cooling unit is adapted to be suspended.

In some embodiments at least one of the cooling element and the solar energy gathering component are adapted to be suspended in a window, on a wall or on another vertically oriented surface.

In some embodiments the solar energy gathering component is a solar heating component and the energy is heat.

In some embodiments the energy is electricity.

In some embodiments the cooling element is an absorption cooling system that generates the cooling through an absorption cooling process driven by heat.

In some embodiments the absorption cooling system comprises a continuous cycle absorption cooling system.

In some embodiments the absorption cooling system comprises: a boiler configured to absorb heat generated by the solar heating component to cause refrigerant to vaporize out of a solution of refrigerant and absorbent; a condenser functionally connected to the boiler and configured to cause the vaporized refrigerant to condense into liquid refrigerant; an evaporator functionally connected to the condenser and configured to cause the liquid refrigerant from the condenser to evaporate; and an absorber functionally connected between the evaporator and the boiler and configured to absorb the evaporated refrigerant from the evaporator back into the solution of refrigerant and absorbent.

In some embodiments the solar heating component comprises at least one heating element configured to absorb solar radiation and convert the solar radiation to heat to apply to the boiler of the absorption cooling system.

In some embodiments the at least one heating element of the solar heating component comprises at least one heating bar and the boiler of the absorption cooling system comprises at least one circulation tube that extends through an internal portion of the at least one heating bar to circulate the solution of refrigerant and absorbent through the heating bar to heat the solution and cause the refrigerant to vaporize out of the solution.

In some embodiments the heating bar contains thermal fluid surrounding the circulation tube.

In some embodiments the solar heating element further comprises a thermal fluid expansion chamber in fluid communication with the heating bar to permit expansion of the thermal fluid.

In some embodiments the boiler of the absorption cooling system further comprises a backflow column and a percolation tube, wherein the percolation tube is in fluid communication between the circulation tube and the backflow column to permit absorbent to flow back to the backflow column and vaporized refrigerant to flow to the condenser.

In some embodiments the solar heating component further comprises a solar concentrator configured to concentrate solar radiation on the at least one heating bar.

In some embodiments the solar concentrator comprises a reflective material that acts substantially as a two-way mirror, such that the solar concentrator is substantially transparent when viewed from a first inner side and substantially reflective when viewed from a second outer side to substantially reflect solar radiation on the at least one heating bar.

In some embodiments the solar concentrator comprises at least one trough-shaped reflector configured to concentrate solar radiation on the at least one heating bar.

In some embodiments each heating bar is positioned so that it extends substantially parallel along a length of a focal zone of a corresponding trough-shaped reflector of the solar concentrator.

In some embodiments the at least one heating bar and the at least one trough-shaped reflector are arranged substantially horizontally or substantially vertically when in operation.

In some embodiments the at least one trough-shaped reflector has an elliptical and/or parabolic profile.

In some embodiments the at least one trough-shaped reflector includes a lower parabolic curve portion of approximately 100 degrees around a focal point and an upper elliptical curve portion graduated from 101 degrees to 180 degrees.

In some embodiments the at least one heating bar is at least partially constructed of a solar radiation absorbing material to directly convert solar radiation to heat to apply to the boiler of the absorption cooling system.

In some embodiments the electricity is used to power at least one electrical heating element to generate heat to apply to the boiler of the absorption cooling system.

In some embodiments the electricity is used to power a fan.

In some embodiments the at least one heating element of the solar heating component comprises a panel solar collector to absorb solar radiation. The panel solar collector may be a flat panel solar collector.

In some embodiments the boiler of the absorption cooling system comprises at least one circulation tube that extends through an internal portion of the panel solar collector to circulate the solution of refrigerant and absorbent through the panel solar collector to heat the solution and cause the refrigerant to vaporize out of the solution.

In some embodiments the panel solar collector comprises at least one photovoltaic cell configured to absorb solar radiation and convert the solar radiation to electricity to power at least one electrical heating element to generate heat to apply to the boiler of the absorption cooling system.

In some embodiments the panel is configured to be used in a window.

In some embodiments the panel is configured to be set into an outer wall of a structure, and the cooling system comprises a functional connection between from at least one of the absorption cooling system and a fan, through the outer wall, to the panel.

In some embodiments the at least one photovoltaic cell is at least semi-transparent.

In some embodiments the absorption cooling system is configured such that air is cooled by passing over at least a portion of the evaporator of the absorption cooling system.

In some embodiments the cooling system further comprises a venting hood partially covering at least a portion of the evaporator and being configured to distribute cooled air from the absorption cooling system that has passed over the evaporator.

In some embodiments the venting hood comprises a plurality of distribution fins positioned such that they are distributed along a length of the evaporator, the plurality of distribution fins being configured to direct distribution of air passing over the evaporator.

In some embodiments the plurality of distribution fins are positioned within the venting hood such that, for each distribution fin, a distance from an interior surface of the venting hood to a lower portion of the distribution fin is greater than a distance from the interior surface of the venting hood to an upper portion of the distribution fin.

In some embodiments the absorption cooling system further comprises at least one fan configured to move air over the evaporator.

In some embodiments the cooling system further comprises a tray for objects to be cooled by the cooled air distributed by the venting hood.

In some embodiments the tray is integrated with the venting hood by means of a hinged connection to allow the tray to be flipped-up or flipped-down. The cooling system may or may not include a fan for blowing cooled air over the tray.

In some embodiments, the cooling system further comprises a bin for holding objects to be cooled by the cooled air.

In some embodiments the cooling system further comprises at least one supporting element configured to support the cooling system in a window, on a wall or on another vertically oriented surface.

In some embodiments the refrigerant comprises ammonia and the absorbent comprises water.

In some embodiments the at least one heating element of the solar heating component comprises an evacuated solar collector tube.

In some embodiments the evacuated solar collector tube comprises a heat-conducting rod extending at least partially through an interior of the tube and a heat conducting extension functionally connected to the heat-conducting rod, the at least one heat-conducting rod and heat conducting extension being configured to deliver heat from the tube to the boiler.

In some embodiments at least one of the heat-conducting rod and the heat conducting extension comprises copper.

In some embodiments the cooling element comprises at least one thermoelectric component.

In some embodiments the at least one thermoelectric component comprises at least one thermoelectric plate.

In some embodiments the energy is electricity.

In some embodiments the cooling system further comprises at least one fan to distribute the cooling generated by the at least one thermoelectric component.

In some embodiments the solar energy gathering component comprises a photovoltaic collector.

In some embodiments the photovoltaic collector comprises a panel photovoltaic collector.

In some embodiments the at least one thermoelectric component is attached to the solar energy gathering component.

In some embodiments the cooling system further comprises a housing configured to hold the at least one thermoelectric component and at least one fan.

In some embodiments the housing comprises at least one vent opening that allows air to flow into the housing to be cooled by the at least one thermoelectric component.

In some embodiments the at least one fan is arranged to blow cooled air out of the housing.

In some embodiments the thermoelectric component comprises a cool side and a hot side, and cooling system further comprises one or more thermal conductors arranged to distribute at least one of heat and cooling away from the thermoelectric component.

In some embodiments the cooling system comprises a first thermal conductor and a second thermal conductor, the first thermal conductor being arranged to distribute heat away from the hot side of the thermoelectric component, and the second thermal conductor being arranged to distribute cooling away from the cool side of the thermoelectric component.

In some embodiments the first thermal conductor comprises steel, and the second thermal conductor comprises aluminum.

In some embodiments the first thermal conductor is a solid block, and the second thermal conductor comprises a plurality of fins.

In some embodiments the cooling system further comprises a gasket to insulate the first thermal conductor from the second thermal conductor.

In some embodiments the gasket comprises a first portion near or against the second thermal conductor and a second portion that at least partially surrounds the first thermal conductor.

In some embodiments the first portion of the gasket comprises silicone rubber and the second portion of the gasket comprises natural rubber.

In some embodiments the cooling element includes at least one thermoelectric component, and means for connecting the cooling system to the solar energy gathering component.

In some embodiments the means for connecting the cooling system to the solar energy gathering component is a wire.

According to another aspect of the disclosure, there is provided, a thermoelectric cooling system comprising: a thermoelectric cooling component having a cool side and a hot side; at least one fan; a first thermal conductor and a second thermal conductor, the first thermal conductor being arranged to distribute heat away from the hot side of the thermoelectric component, and the second thermal conductor being arranged to distribute cooling away from the cool side of the thermoelectric component; and a housing configured to hold the at least one thermoelectric component and the at least one fan and the first and second thermal conductors.

In some embodiments wherein the first thermal conductor comprises steel, and the second thermal conductor comprises aluminum.

In some embodiments the first thermal conductor is a solid block, and the second thermal conductor comprises a plurality of fins.

In some embodiments the thermoelectric cooling system further comprises at least one gasket to insulate the first thermal conductor from the second thermal conductor.

In some embodiments the at least one gasket comprises a first portion near or against the second thermal conductor and a second portion that at least partially surrounds the first thermal conductor.

In some embodiments the first portion of the at least one gasket comprises silicone rubber and the second portion of the at least one gasket comprises natural rubber.

Other aspects and features of the present invention will become apparent, to those ordinarily skilled in the art, upon review of the following description of the specific embodiments of the invention.

BRIEF DESCRIPTION OF THE DRAWINGS

Embodiments of the invention will now be described in greater detail with reference to the accompanying drawings, in which.

DETAILED DESCRIPTION

Figure 1:
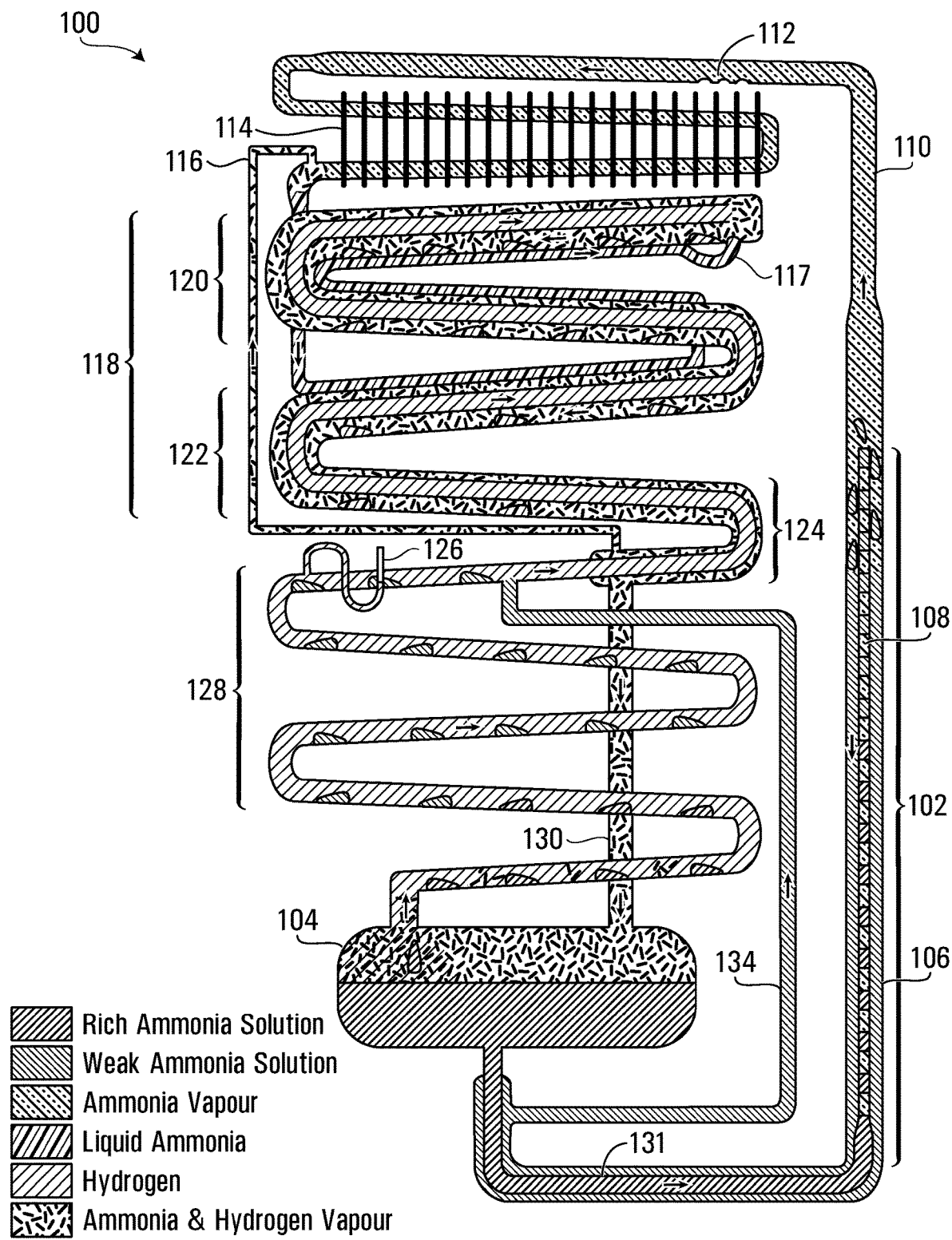
FIG. 1 is a non-original schematic view of a conventional absorption cooling system without a conventional heating component.

In the following detailed description of sample embodiments, reference is made to the accompanying drawings, which form a part hereof, and in which is shown by way of illustration specific sample embodiments in which the present invention may be practised. These embodiments are described in sufficient detail with reference to the Figures to enable those skilled in the art to practice the invention, and it is to be understood that other embodiments may be utilized and that logical, mechanical, electrical, and other changes may be made without departing from the scope of the invention. The following detailed description is, therefore, not to be taken in a limiting sense, and the scope is defined by the appended claims.

Absorption cooling systems offer an alternative to compressor-based cooling systems and have been used in the past in applications where compressor-based cooling systems are unsuitable, such as in the refrigeration systems for refrigerators in mobile homes or hotel rooms, where the electricity supply is limited and/or the noise from cycling a compressor on/off is undesirable.

Absorption cooling systems utilize heat to generate cooling through an absorption cooling process, an example of which is described in detail later with reference to FIG. 1.

In many mobile home refrigeration system applications, the heat that is required to power the absorption cooling process is generated by burning fuel, such as propane.

Thermoelectric cooling systems utilize thermoelectric components that can generate cooling when driven by electricity. For example, typical thermoelectric plates, such as Peltier plates, have two layers of different semiconductor materials separated by a junction. The outer surface of the two layers of semiconductor materials are each covered by a respective thermally conductive plate. Each thermally conductive plate creates a side or side surface of the thermoelectric plate. One surface is a hot side, and one side is a cool side. When driven by electricity, a heat flux between is created across the junction of the two different semiconductor materials. This heat flux is created by the Peltier effect. Thus, heat from the cool side is transferred to the hot side. The cool side becomes cool and the hot side becomes hot.

Various aspects of the present invention provide an air cooling system including a cooling element and a solar energy gathering component configured to generate energy to drive the cooling element to generate cooling. At least one of the cooling element and a solar energy gathering component are adapted to be suspended (e.g. in a window or on a wall). The cooling element and the solar energy gathering component may be integrated to form a cooling unit, and the entire unit may be adapted to be suspended. In some embodiments, the cooling element and/or the solar energy gathering component of the air cooling system are adapted to be suspended in a window, on a wall or on other vertically oriented surface.

In some embodiments, the cooling system is an absorption cooling system driven by heat. The absorption cooling system is configured to generate cooling through a cooling process driven by energy that is generated by the solar energy gathering component. In other embodiments the cooling element is a thermoelectric cooling system. In some embodiments, the solar energy gathering component is a solar heating component and the energy is heat. In some embodiments, the energy is electricity. By utilizing energy from solar radiation to drive the absorption cooling process, the cooling system may reduce the demand on the electrical distribution system and the associated operational costs incurred by conventional compressor-based electrically powered air cooling systems.

The operation of a conventional absorption cooling system will now be described by way of example with reference to FIG. 1.

FIG. 1 is a schematic view of a conventional absorption cooling system 100 without the heating component that is conventionally used to generate heat to drive the absorption cooling process.

Absorption cooling system 100 shown in FIG. 1 is a continuous cycle ammonia-water absorption cooling system that uses ammonia as a refrigerant and water as an absorbent.

Absorption cooling system 100 includes an absorber tank 104, a boiler 102 functionally connected to absorber tank 104, a rectifier 110 functionally connected to boiler 102, a condenser 114 functionally connected to rectifier 110, an evaporator 118 functionally connected to condenser 114, and an absorber 128 functionally connected between evaporator 118 and absorber tank 104. A vapour return tube 130 is functionally connected between evaporator 118 and absorber tank 104. A vent tube 116 is functionally connected between condenser 114 and vapour return tube 130. A condenser drain tube 117 is functionally connected between condenser 114 and the evaporator 118. A weak solution return tube 134 is functionally connected between absorber 128 and boiler 102, acting to help absorb the ammonia as it returns to the absorber tank 104.

Boiler 102 includes a rich solution feed tube 131 that is functionally connected to absorber tank 104, a percolation tube 108 that is functionally connected to rich solution feed tube 131, and a backflow column 106. Rich solution feed tube 131 and percolation tube 108 extend through an internal portion of backflow column 106. Percolation tube 108 has an open end within backflow column 106 that provides fluid communication between percolation tube 108 and backflow column 106.

Weak solution return tube 134 is functionally connected between backflow column 106 of boiler 102 proximal the absorber tank 104 and absorber 128 proximal the functional connection between absorber 128 and evaporator 118.

Evaporator 118 includes a low temperature evaporator section 120 and a high temperature evaporator section 122. Low temperature evaporator section 120 is functionally connected to condenser 114 and high temperature evaporator section 122. High temperature evaporator section 122 is functionally connected to low temperature evaporator section 120 and absorber 128. The functional connection between high temperature evaporator section 122 and absorber 128 forms a gas heat exchanger 124.

In some embodiments, absorber 128 includes a "pinch" tube 126 which is used to set the fluid fill limit. The fluid level may be at the same level in the absorber 128 as the fluid-return level is in the boiler 102.

In the illustrated example, ammonia is used as a refrigerant and water is used as an absorbent. Absorber tank 104 contains a rich ammonia solution. That is, the solution of refrigerant (ammonia) and absorbent (water) in absorber tank 104 is relatively high in refrigerant (ammonia), which in this case means that absorber tank 104 contains a rich ammonia solution.

In operation, refrigerant vapour, ammonia vapour in this case, is produced by applying heat to boiler 102, typically proximal the functional connection between rich solution feed tube 131 and percolation tube 108. The heat causes the rich ammonia solution in percolation tube 108, which is drawn from absorber tank 104 via rich solution feed tube 131, to boil causing ammonia to vaporize out of the rich ammonia solution at the open end of percolation tube 108. When the ammonia vaporizes out of the rich ammonia solution in percolation tube 108, it leaves a relatively weak ammonia solution to flow back to absorber 128 via backflow column 106 and weak solution return tube 134.

The ammonia vapour, once out of solution, proceeds to pass through rectifier 110 and on to condenser 114. Rectifier 110 is extended vertically to ensure water percolating from the percolation tube 108 below does not reach the condenser 114 and also to ensure that water vapour that may have vaporized with the ammonia vapour has time to condense quickly and fall back, in order to prevent that water vapour from continuing on to condenser 114.

In some embodiments, rectifier 110 includes a water separating structure, which in the illustrated embodiment includes a plurality of ridges 112 in the tubing of rectifier 110.

In condenser 114, the ammonia vapour cools and condenses into liquid ammonia. The cooled liquid ammonia passes from condenser 114 into the low temperature section 120 of evaporator 118 via the condenser drain tube 117, where hydrogen vapour is added. This causes the pressure of the liquid ammonia to be reduced to its partial pressure at evaporator temperature due to the presence of hydrogen gas in the evaporator. Due to the reduction in pressure, the ammonia evaporates as it flows through the low temperature section 120 and the high temperature section 122 of evaporator 118, absorbing heat from evaporator 118 and evaporating into the hydrogen, leaving evaporator 118 as a saturated vapour solution of ammonia and hydrogen. Vent tube 116 allows some of the saturated vapour solution of ammonia and hydrogen at the output of evaporator 118 to vent back to the output of the condenser 114 to condense with the output of the condenser 114.

The saturated vapour solution of ammonia and hydrogen returns to absorber tank 104 via vapour return tube 130.

To separate the ammonia from the hydrogen, the saturated vapour solution of ammonia and hydrogen enters the absorber 128 at the bottom of an uphill series of tubes, and flows upward. The weak ammonia solution from the weak solution return tube 134 travels to absorber 128 and enters it at the top of the uphill series of tubes, and flows downward. While travelling upward thought the uphill series of tubes in absorber 128, the ammonia in the saturated vapour solution of ammonia and hydrogen is absorbed into the weak ammonia solution, creating a relatively strong ammonia solution. As a result, relatively pure hydrogen vapour exits the top of the uphill series of tubes in absorber 128, while a relatively rich ammonia solution exits the bottom of the uphill series of tubes in absorber 128, which is then drawn back to boiler 102. In this example, the cycle repeats continuously as heat is applied to boiler 102.

The cooling that is provided by absorption cooling system 100 is generated when the cooled liquid ammonia absorbs heat from evaporator 118 and evaporates. This causes evaporator 118 to cool. The cooling of evaporator 118 can then be used for refrigeration or air cooling applications.

It should be noted that the example of an absorption cooling system shown in FIG. 1 is provided for illustrative purposes only and aspects of the present invention are not limited to absorption cooling systems such as the one shown in FIG. 1, but can potentially be used with a heat-driven absorption cooling system.

As can be seen from the foregoing explanation of the operation of the continuous cycle absorption cooling system shown in FIG. 1, an absorption cooling system, unlike a compressor-based cooling system, does not necessarily require any moving parts to generate the cooling. In such a system, the cooling can be generated continuously by simply applying sufficient heat to the percolation tube 108 or to the boiler 102 that in turn will heat the percolation tube to drive the vaporization-condensation-evaporation-absorption cycle described above.

As noted earlier, in many known absorption cooling systems, the external heat that is applied to boiler 102 is generated by burning fuel, such as propane or natural gas. In some cases it is generated by electricity. In some cases, waste heat from industrial machinery or exhaust gases from internal combustion engines have also been used to drive absorption cooling systems.

Figure 2:
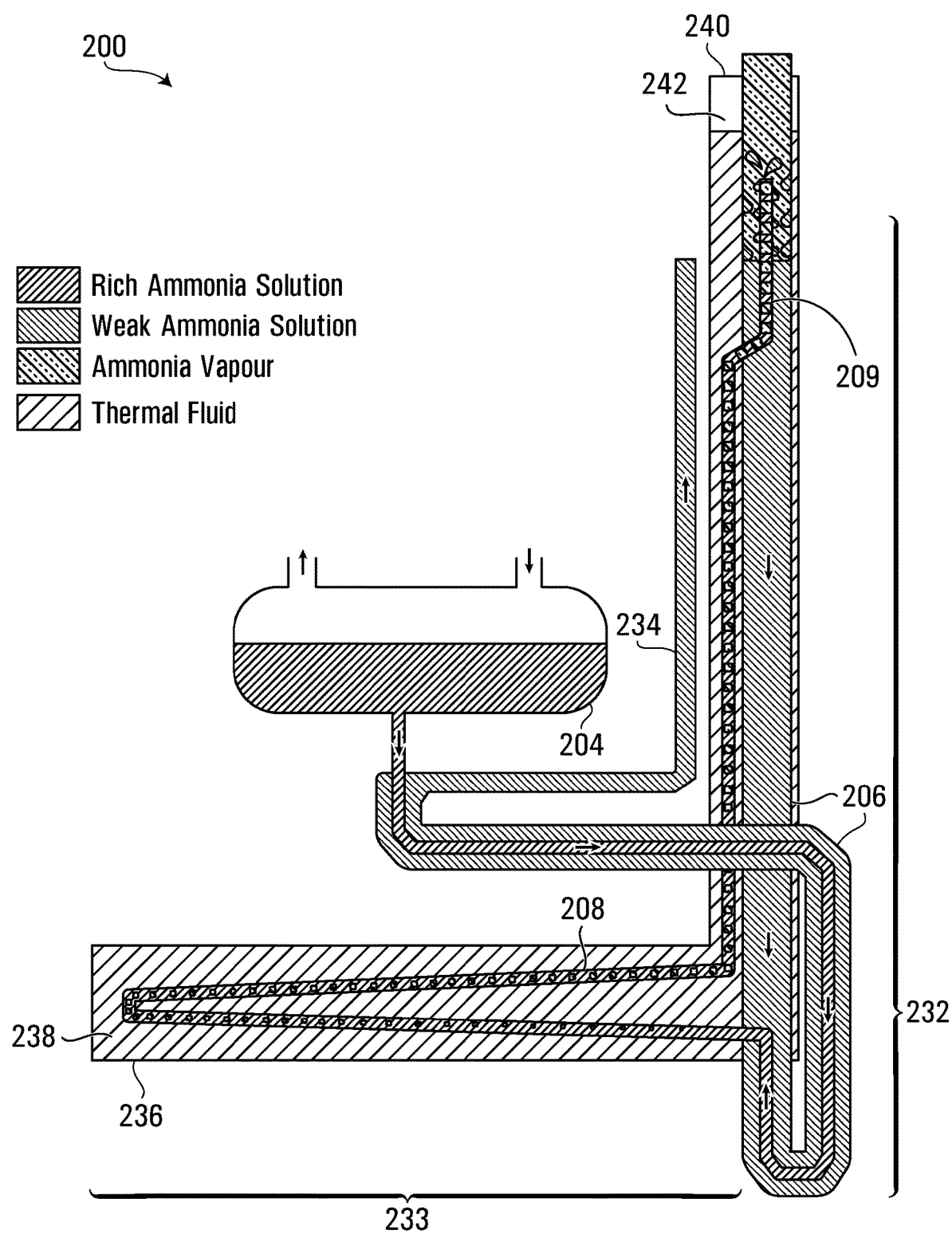
FIG. 2 is a schematic view of a portion of an absorption cooling system with a solar heating component in accordance with an embodiment of the present invention.

FIG. 2 is a schematic view of a portion of an absorption cooling system 200 with a solar heating component in accordance with an embodiment of the present invention.

The portion of the absorption cooling system 200 shown in FIG. 2 includes an absorber tank 204 and a weak solution return tube 234, which are similar to the absorber tank 104 and weak solution return tube 134 of absorption cooling system 100 shown in FIG. 1. However, the absorption cooling system 200 shown in FIG. 2 has a boiler 232 configured to be driven with heat generated by a solar heating component 233 that includes a heating bar 236 that contains a thermal fluid 238, and a thermal fluid expansion chamber 240.

Boiler 232 includes a circulation tube 208, a percolation tube 209 and a backflow column 206. Circulation tube 208 is functionally connected between absorber tank 204 and percolation tube 209 and extends through an internal portion of backflow column 206, heating bar 236 and thermal fluid expansion chamber 240. Percolation tube 209 has an open end within backflow column 206 that provides fluid communication between percolation tube 209 and backflow column 206.

In operation, solar radiation absorbed by heating bar 236 is converted to heat, which is applied to the rich solution of refrigerant and absorbent from absorber tank 204 circulating through heating bar 236 in circulation tube 208 through a liquid heat exchange process facilitated by thermal fluid 238, which heats the solution and causes the refrigerant to vaporize out of the solution. The vaporized refrigerant is separated from the remaining weak solution at the opening of percolation tube 209 within backflow column 206 and continues on to a rectifier and a condenser (not shown in FIG. 2) to undergo the remainder of the absorption cooling process cycle similar to that described above with respect to FIG. 1. The remaining weak solution flows back to an absorber (not shown in FIG. 2) via backflow column 206 and weak solution return tube 234.

Weak solution return tube 234 is functionally connected between backflow column 206 of boiler 232 proximal the absorber tank 204 and the absorber (not shown in FIG. 2) proximal the functional connection between the absorber and the evaporator (not shown).

In the illustrated example, thermal fluid expansion chamber 240 is not entirely filled with thermal fluid 238 so that there is a gap 242 at the top of thermal fluid expansion chamber 240 to allow for expansion of thermal fluid 238.

In some embodiments, the solar heating component 233 includes a solar concentrator (not shown in FIG. 2), which is used to concentrate solar radiation on heating bar 236. A solar concentrator works by having one or more reflective surfaces that reflect solar radiation so that it is concentrated on a focal zone that is smaller than the reflective surfaces themselves, thereby concentrating the reflected solar radiation.

In the example shown in FIG. 2, heat is generated to drive the absorption cooling system. However, other embodiments generate electricity instead of heat to drive the system. For example, the cooling system could include an electrical heating component powered by said electricity.

The thermal fluid 238 of heating bar 236 may comprise an oil, an oil mixture, or a combination of oil(s) and other fluid components. The thermal fluid 238 may retain heat for an extended time. For example, the thermal fluid 238 may retain heat such that the system shown in FIG. 2 can sustain cooling for a time when solar energy is no longer being substantially collected.

Figure 6:
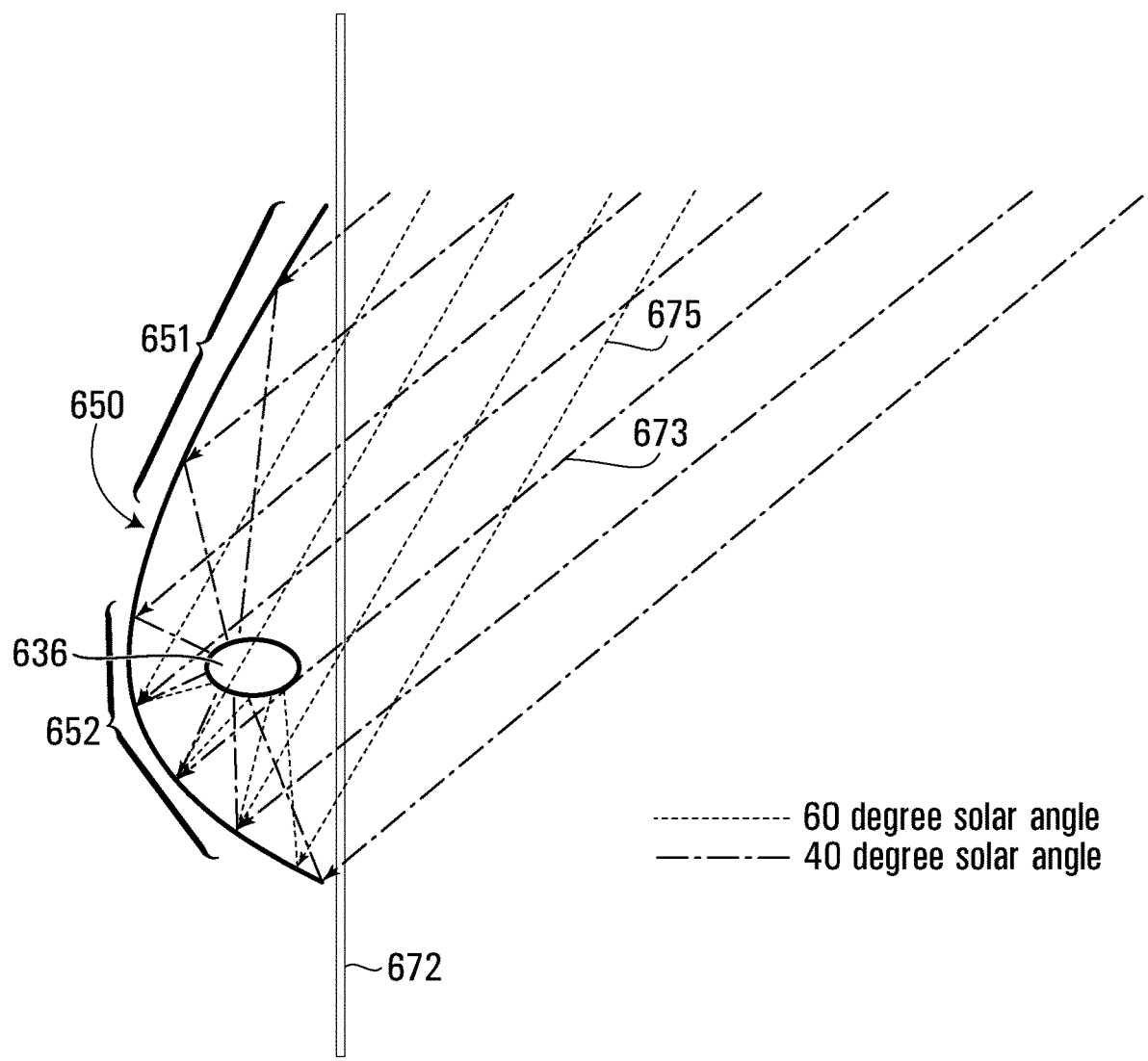
FIG. 6 is a side view of a solar concentrator in accordance with an embodiment of the present invention.

FIG. 6 is a side view of an example of a solar concentrator 650 that may be used in some embodiments of the present invention. The solar concentrator 650 shown in FIG. 6 has a trough-like shape with a side profile that is generally elliptical in shape. In some embodiments the side profile of the solar concentrator is simply parabolic or elliptical. In this embodiment, the solar concentrator 650 is a composite of elliptical curves generally in top section 651 and parabolic curves in lower section 652. The lower section 652 includes generally 100 degrees of a circle around which a target focal point (in this example, where the target focal point would meet the glass of a window). The balance of the top section 651 of the solar concentrator 650 is graduated from 101 degrees to 180 degrees. The graduation is even in this example, but other curves may be used. The curve approaches flat at the very top.

The solar concentrator 650 is constructed of a reflective material that causes solar radiation reflected by solar concentrator 650 to be concentrated on a focal zone 636. For illustrative purposes, FIG. 6 shows that, even as the angle of solar radiation changes due to the rotation of the earth throughout the day, the elliptical shape of the solar concentrator 650 continues to focus the reflected solar radiation on focal zone 636. In particular, FIG. 6 shows that solar radiation 673 at a solar angle of 40 degrees and solar radiation 675 at a solar angle of 60 degrees are both concentrated on focal zone 636.

With reference again to FIG. 2, positioning heating bar 236 so that its length extends substantially parallel along a length of focal zone 636 (shown in FIG. 6) results in the solar radiation reflected by solar concentrator 650 (shown in FIG. 6) being concentrated on heating bar 236.

As shown in FIG. 6, solar concentrator 650 is configured to be installed in a window 672 in order to concentrate solar radiation that has passed through the window 672. In other embodiments, the solar concentrator may also be adapted to be suspended on a wall or another vertically oriented surface. In some cases, obstructing the view from a window may be acceptable and therefore solar concentrator 650 could potentially be constructed of a material that is substantially opaque when viewed from behind its inner side. However, in many cases it may be preferable to construct the solar concentrator 650 from a reflective material that acts substantially as a two-way mirror, such that the solar concentrator 650 is substantially transparent when viewed from its inner side and substantially reflective when viewed from its outer side. Alternatively, the solar concentrator 650 could be constructed with a material that acts as a one-way mirror (with embedded silver, for example).

While the solar concentrator 650 shown in FIG. 6 forms a varied elliptical-shaped trough to convenience the balanced positioning of the cooling system in the window, more generally any concave trough-shaped reflector could potentially be used to concentrate solar radiation. In addition, while the solar concentrator 650 includes a single concave trough-shaped reflector that is horizontally oriented, other implementations include multiple trough-shaped reflectors that may be horizontally or vertically-oriented. Examples of multi-trough solar concentrators that may be used in some embodiments of the present invention will be discussed later with reference to FIGS. 22 and 23.

An example of an air cooling system showing the integration of an absorption cooling system and a solar concentrator heating component will now be described with reference to FIGS. 3A and 3B.

Figure 3A:
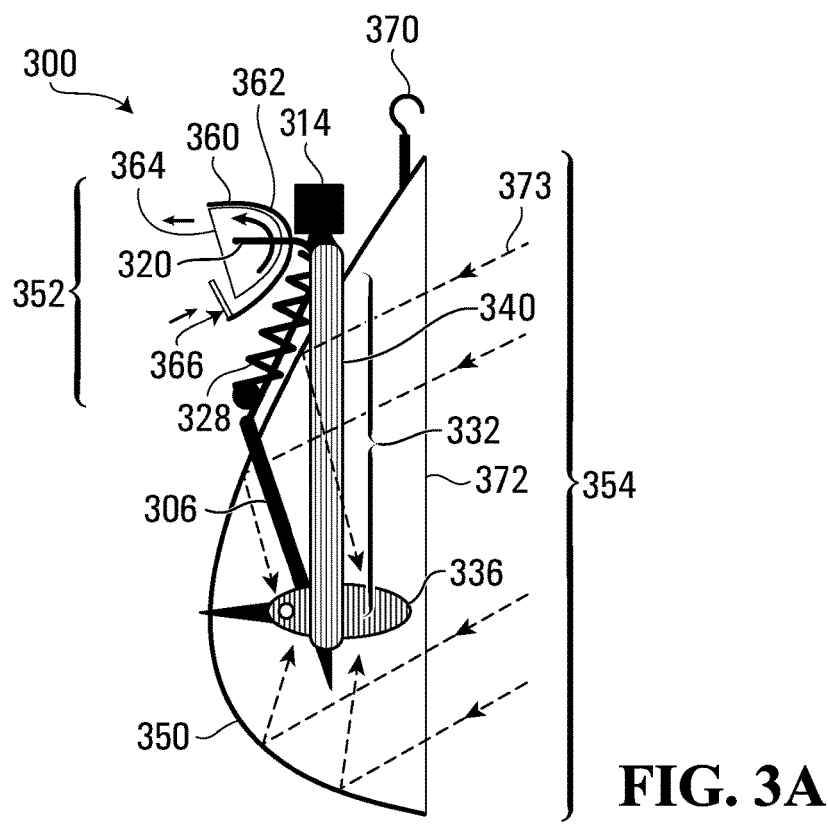
FIG. 3A is a side view of a cooling unit with a solar concentrator heating component in accordance with an embodiment of the present invention.
Figure 3B:
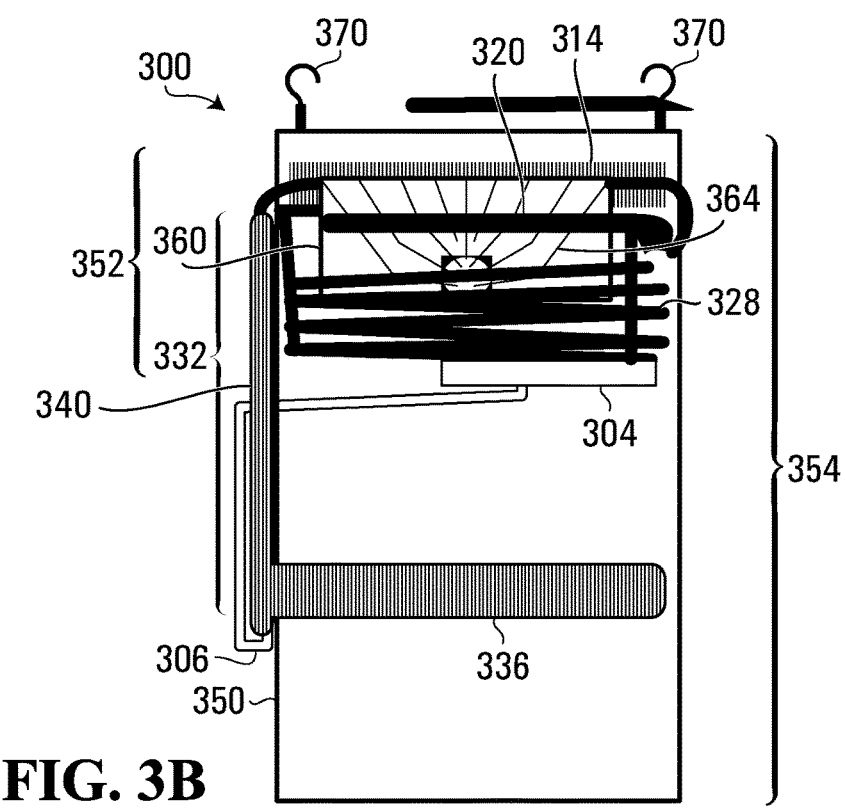
FIG. 3B is a rear view of the cooling unit shown in FIG. 3A.

FIGS. 3A and 3B are side and rear views respectively of a cooling unit 300 that includes an absorption cooling system 352 and a solar concentrator heating component 354 in accordance with an embodiment of the present invention.

Solar concentrator heating component 354 includes an elliptical-shaped solar concentrator 350, a heating bar 336 and a thermal fluid expansion chamber 340. Heating bar 336 and thermal fluid expansion chamber 340 are arranged in the same manner as heating bar 236 and thermal fluid expansion chamber 240 shown in FIG. 2. Heating bar 336 is positioned so that it extends substantially parallel along a length of a focal zone of solar concentrator 350.

Absorption cooling system 352 is similar in design to absorption cooling system 100 shown in FIG. 1, but has been modified in the manner shown in FIG. 2 in order to function with solar concentrator heating component 354. Absorption cooling system 352 includes a boiler 332 configured to absorb heat generated by solar concentrator heating component 354, a condenser 314 functionally connected to boiler 332, an evaporator 320 functionally connected to condenser 314, and an absorber 328 functionally connected between evaporator 320 and an absorber tank 304. Boiler 332 includes a circulation tube 306 that is functionally connected between absorber tank 304 and a percolation tube (not visible in FIGS. 3A and 3B) located within an interior portion of a backflow column (not visible in FIGS. 3A and 3B) of boiler 332. Circulation tube 306 extends through an interior portion of heating bar 336.

As can be seen from FIG. 3A, the cooling unit 300 includes support elements 370 for mounting or suspending cooling unit 300 in a window 372. In the illustrated example, the support elements are implemented by hangers that may be used to hang cooling unit 300 from, for example, a rod, window-frame mouldings or other structure secured to or formed by a window frame or wall. Hangers are merely one example of support elements that may be used to support air cooling unit embodiments of the present invention. More generally, any support element suitable for mounting or suspending a cooling unit in a window or other vertical surface on a temporary or permanent basis may be used.

In operation, solar radiation 373 that passes through window 372 is reflected and concentrated by solar concentrator 350 on heating bar 336, which absorbs the concentrated solar radiation and converts it to heat. The heat generated by heating bar 336 is applied to a rich solution of refrigerant and absorbent that is circulated through heating bar 336 via circulation tube 306, which causes the refrigerant to vaporize out of the solution at the end of the percolation tube (not shown in FIG. 3A) within boiler 332. The vaporized refrigerant continues on through condenser 314, evaporator 320 and absorber 328 in accordance with the absorption cooling process described above with reference to FIG. 1, which results in cooling being generated at evaporator 320.

In some embodiments, heating bar 336 is at least partially constructed of a solar radiation absorbing material that absorbs solar radiation and directly converts it to heat to apply to the boiler 332 of absorption cooling system 352. However, in some embodiments, heating bar 336 may include one or more photovoltaic cells configured to absorb solar radiation and convert the solar radiation to electricity to power. The power from the photovoltaic cells may be used to power at least one electrical heating element to generate heat to apply to the boiler 332 of the absorption cooling system 352. The electricity may also power other elements (such as a fan, for example).

In addition to absorption cooling system 352 and solar concentrator heating component 354, cooling unit 300, in this example, also includes a venting hood 360 that is functionally connected to evaporator 320. However, some embodiments do not include a venting hood as shown.

In some embodiments, the cooling unit includes a heat venting mechanism (not shown) for venting heat given off by the cooling unit as part of the absorption cooling process. For example, the venting mechanism could vent heat from the area of the condenser to outside of a window or structure. The venting mechanism may include a hose or duct that is configured to be mounted in an opened portion of a window, for example.

Figure 4A:
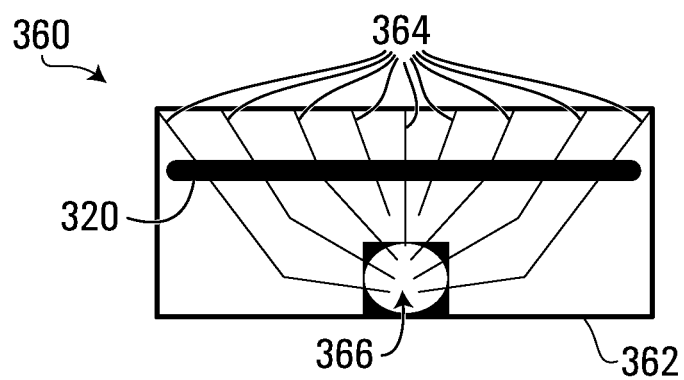
FIG. 4A is a front view of a venting hood in accordance with an embodiment of the present invention.
Figure 4B:
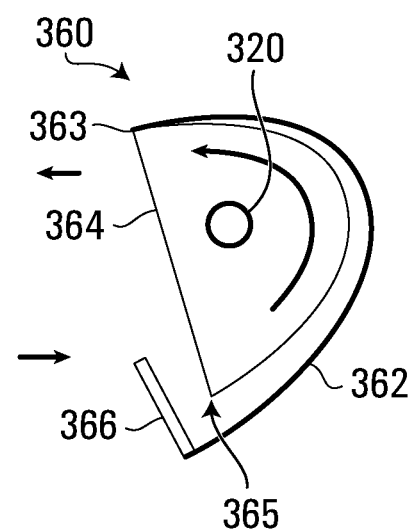
FIG. 4B is a side view of the venting hood shown in FIG. 4A.

FIGS. 4A and 4B include a rear view and a side view, respectively, of venting hood 360 without the rest of cooling unit 300.

Venting hood 360 is configured such that it includes a curved shroud 362 that partially covers a portion of evaporator 320 to distribute cooled air from the absorption cooling system 352 that has passed over evaporator 320. In the illustrated example, venting hood 360 also includes a plurality of distribution fins 364 within shroud 362 that are positioned such that they are distributed along the length of evaporator 320 that is partially covered by shroud 362. The plurality of distribution fins 364, in conjunction with the shroud 362 are configured to channel and direct the distribution of cooled air from the absorption cooling system 352 (shown in FIGS. 3A and 3B).

In the illustrated example, venting hood 360 also includes a fan 366 that is configured to blow air over evaporator 320, which is then distributed away from cooling unit 300 by distribution fins 364 and shroud 362. Although the illustrated example shown in FIGS. 3A and 3B includes a fan 366, not all embodiments necessarily include a fan. The cooling generated by evaporator 320 will cool the air surrounding the evaporator. As the air is cooled it will naturally "sink" as it becomes denser than the air surrounding it, setting up a natural convection current of warmer air above evaporator 320 being cooled and flowing downward and outward from venting hood 360. Note that this natural convection of air is opposite to the direction of air flow shown in FIG. 3A, which is caused by fan 366.

Although the fan 366 is shown as being located at a lower edge of the shroud 362 of venting hood 360 in FIG. 3A, more generally a fan may be positioned at any location to cause air to be blown over or drawn over evaporator 320. For example, a fan could be positioned near the top edge of the shroud 362 of the venting hood 360 to blow air over the evaporator 320, which would result in an air flow that would match the natural convection air flow described above. In still other embodiments, a fan could be positioned near the top edge of the shroud 362 and could be oriented in the opposite direction so that it draws air over the evaporator 320 and blows the cooled air outward from the venting hood 360.

In the illustrated example shown in FIGS. 3A, 3B, 4A and 4B, the plurality of distribution fins 364 are positioned within venting hood 360 such that, for each distribution fin, a distance from an interior surface of venting hood 360 to a lower portion 365 of the distribution fin is greater than a distance from the interior surface of venting hood 360 to an upper portion 363 of the distribution fin. This is most clearly shown in FIG. 4B. In particular, in the illustrated embodiment, the upper portion 363 of the distribution fin touches the interior surface of shroud 362 proximal where the shroud 362 begins to curve downward at its front edge. This arrangement of the distribution fins 364 and the shroud 362 cause the flow of cooled air to be directed in a generally straight and direct horizontal outward path rather than in a generally diffuse pattern.

As noted earlier, not all embodiments include a fan to promote distribution of the cooled air generated by the cooling unit. In some cases it may be preferable to generate cooling proximal the cooling unit rather than distributing the cooling away from the unit. In such cases, the natural downward convection air movement described above may be sufficient. For example, in some cases the cooling unit may utilize a natural convection process (where the heavier cooled air naturally moves down with gravity) rather than a fan. The cooling unit may include a tray for objects to be cooled. The air may move using the natural convection process onto the tray to cool the objects.

Figure 5:
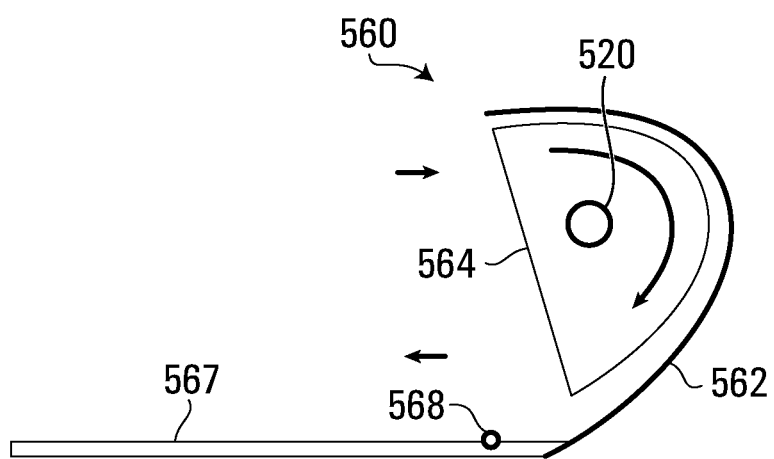
FIG. 5 is a side view of a venting hood in accordance with another embodiment of the present invention.

FIG. 5 is a side view of a venting hood 560 that is integrated with a tray 567. Venting hood 560 includes a shroud 562 and a plurality of distribution fins 564 that are similar to shroud 362 and distribution fins 364 shown in FIG. 4B. In this example, the relative positioning of the distribution fins, shroud, and evaporator cooling bar may be configured to direct the flow of air from the cooling unit in a particular direction. For example, in FIG. 4B the point 363 where the distribution fin 364 meets the slight downward curve of the shroud 362 may generate a laminar air flow away from the hood, rather than an upward flow. In the example of FIG. 5, since there is no fan, the upper portion of the distribution fins 564 do not touch the upper lip of the shroud 562, unlike the arrangement of the distribution fins 364 and the shroud 362 shown in FIG. 4B. This arrangement of the distribution fins 564 may facilitate convective air movement in the downwards direction (different that the example shown in FIG. 4).

In the illustrated example, tray 567 is integrated with venting hood 560 by means of a hinged connection 568 to allow tray 567 to be flipped-up or flipped-down.

In operation, air passing over an evaporator cooling bar 520 is cooled and due to natural convection is directed downward. Shroud 562 and distribution fins 564 direct the distribution of the naturally downward moving cooled air so that it is delivered to tray 567 to cool objects that may be placed on the tray, or a bin which can be put in place of the tray. As an example, items may be stored in the bin while cooled air will flow with gravity down into the bin.

In the illustrated examples shown in FIGS. 3A, 3B, 4A, 4B and 5, the cooling generated by the cooling unit generates cooled air by passing air directly over at least a portion of the evaporator section of the absorption cooling system. However, in some cases, the absorption cooling system may include one or more cooling bars that are configured to be cooled by the evaporator section of the absorption cooling system, and the cooled air may be generated by passing air over the one or more cooling bars rather than, or in addition to, passing over the evaporator directly.

Figure 7:
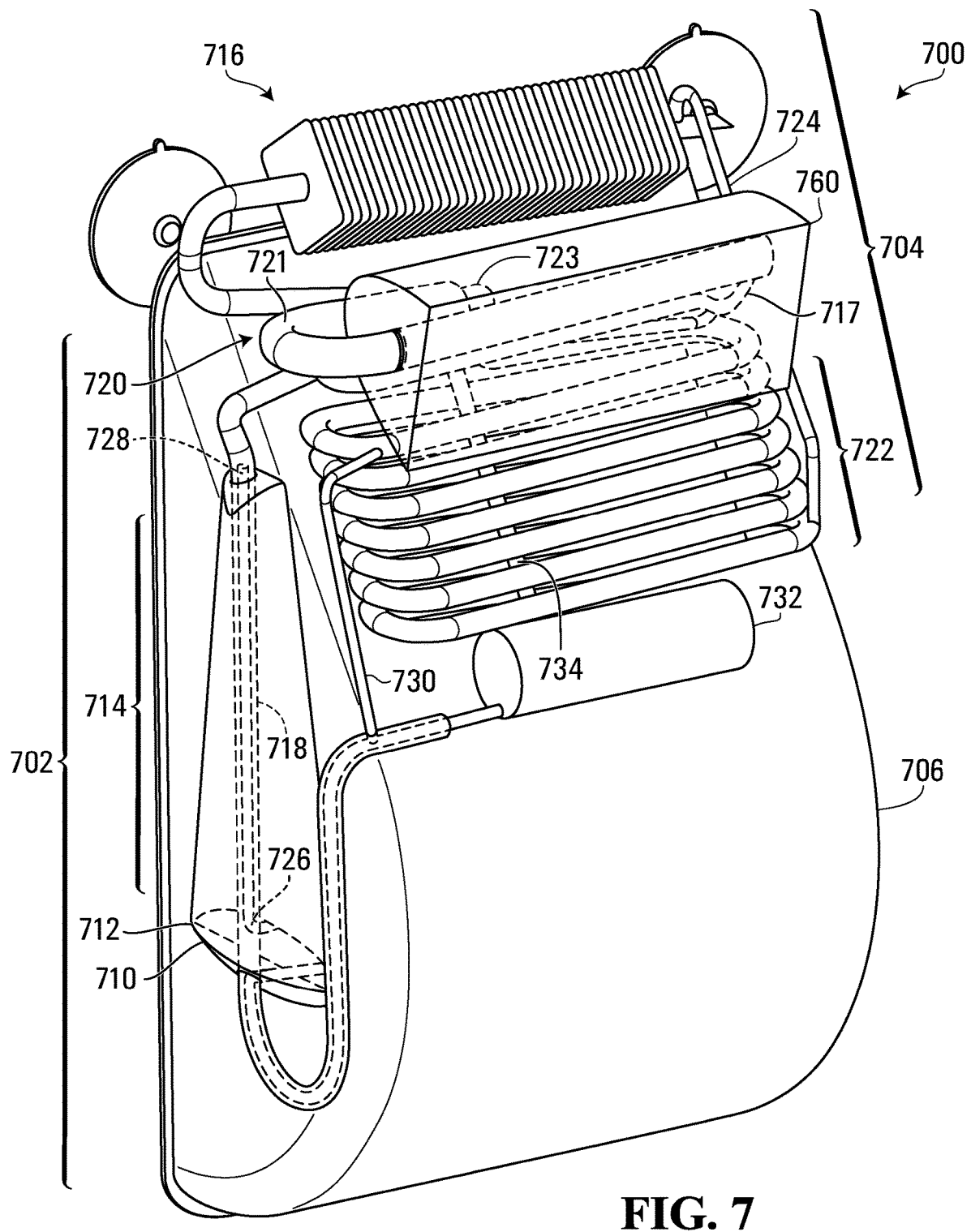
FIG. 7 is a perspective view of another embodiment of a cooling unit for mounting in a window.

FIG. 7 is a perspective view of another embodiment of an air cooling system that is in the form of a single unit that is similar to the cooling unit 300 shown in FIGS. 3A and 3B. FIG. 7 shows cooling unit 700. Cooling unit 700 includes a concentrator heating component 702 that is functionally similar to the solar concentrator heating component 354 shown in FIG. 3. The cooling unit 700 also includes an absorption cooling system 704 that is similar in arrangement and function to the absorption cooling system 352 shown in FIG. 3.

The concentrator heating component 702 includes an elliptical-shaped solar concentrator 706, a heating bar 708 (not shown in FIG. 7, but shown in FIGS. 14 and 18) and a thermal fluid expansion chamber 710. The heating bar 708 and thermal fluid expansion chamber 710 together form an oil heating chamber 712. The thermal fluid in the oil heating chamber 712 is oil in this embodiment. However, as discussed above, other thermal fluids may be used as well.

Figure 19:
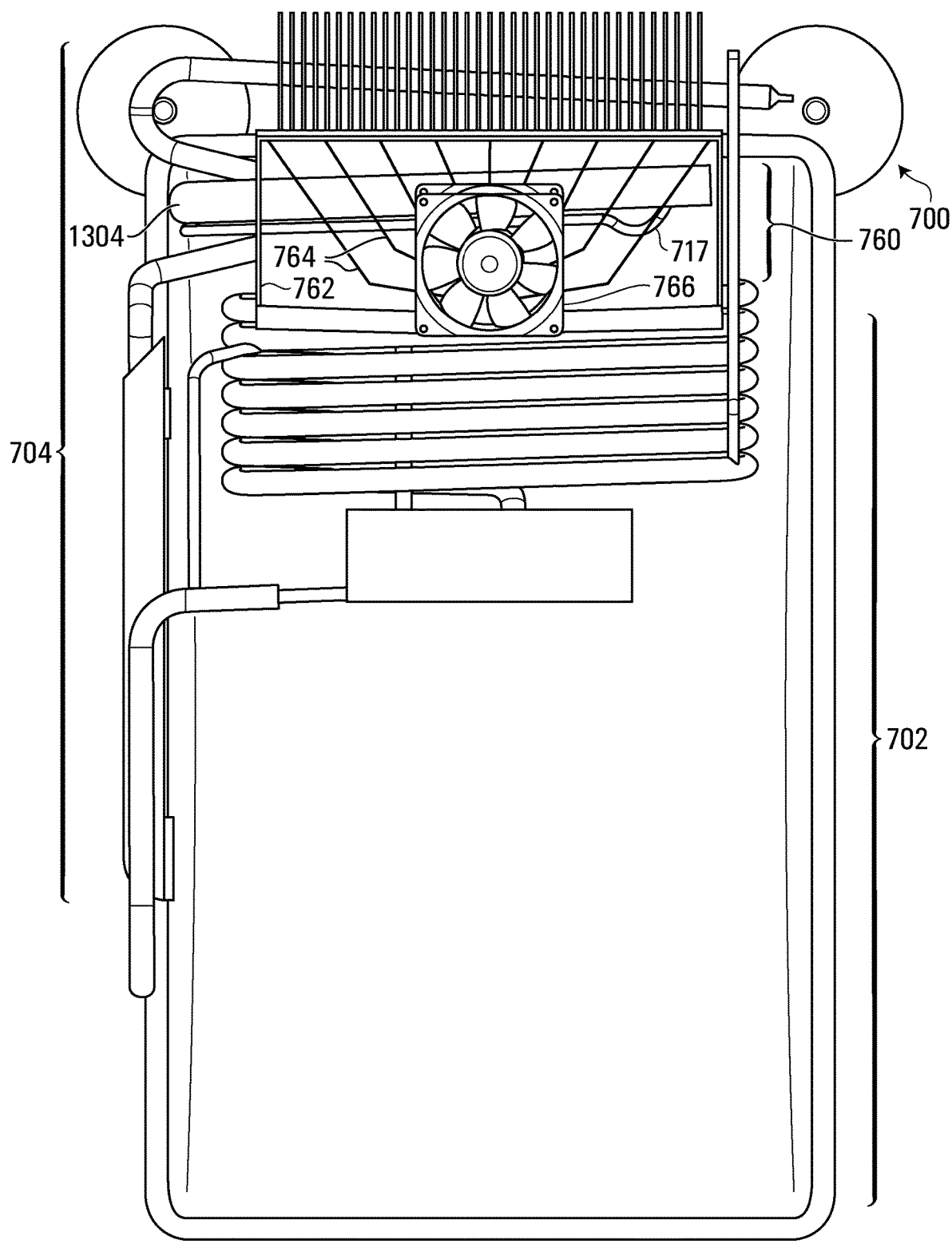
FIG. 19 is a rear perspective view of the cooling unit shown in FIG. 7.

The absorption cooling system 704 includes a boiler 714, a condenser 716, a condenser drain tube 717, a backflow column 718, an evaporator 720, an absorber 722, a vent tube 724 (which may be referred to as a condenser vent tube), a circulation tube 726, a percolation tube 728, vapour return tube 734, an absorber tank 732, and a weak solution return tube 730. The components of the absorption cooling system 704 discussed above function similarly to the similarly named components of the absorption system 100 shown in FIG. 1 and the absorption system 200 shown in FIG. 2. The cooling unit 700 also includes a venting hood 760 that is functionally similar to the venting hood 360 shown in FIG. 4A. The venting 760 hood also includes distribution fins 764 and a fan 766, which are shown in FIG. 19, but removed in FIG. 7 to allow easier viewing of the other components of the system 700. The venting 760 hood is described in more detail below with respect to FIG. 19. The evaporator 720 includes a cooling bar 721 and coil portion 723 that is partially internal to and functionally connected with the cooling bar 721.

FIGS. 8 to 20 show various components of the cooling unit 700 of FIG. 7 in isolation. However, embodiments are not limited to the specific design and/or dimensions shown in FIGS. 8 to 20 and described below. Other embodiments include different arrangements of components and/or components having different dimensions.

Figure 8:
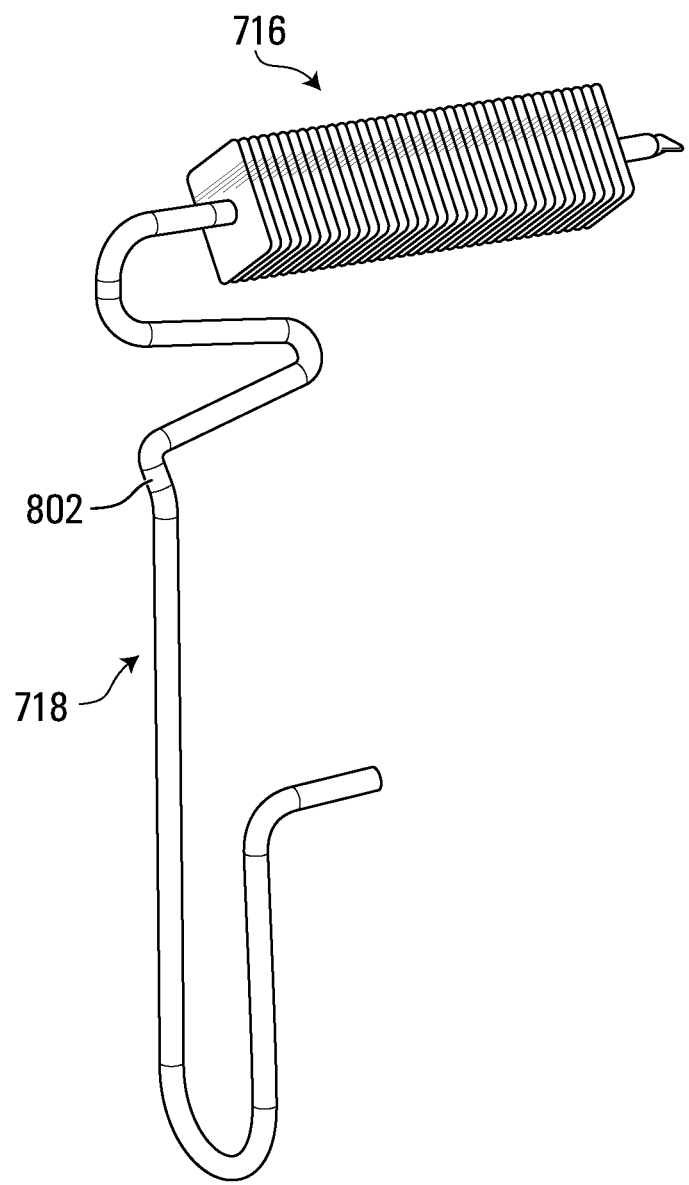
FIG. 8 is a perspective view of a condenser and a backflow column of the cooling unit shown in FIG. 7.

FIG. 8 is a perspective view of the condenser 716 and backflow column 718. In this embodiment, the condenser 716 and backflow column 718 include a pipe 802, which has an inner diameter of approximately 0.375 inches, holds a volume of approximately 5.76 cubic inches, and has a length of approximately 54.8 inches.

Figure 9:
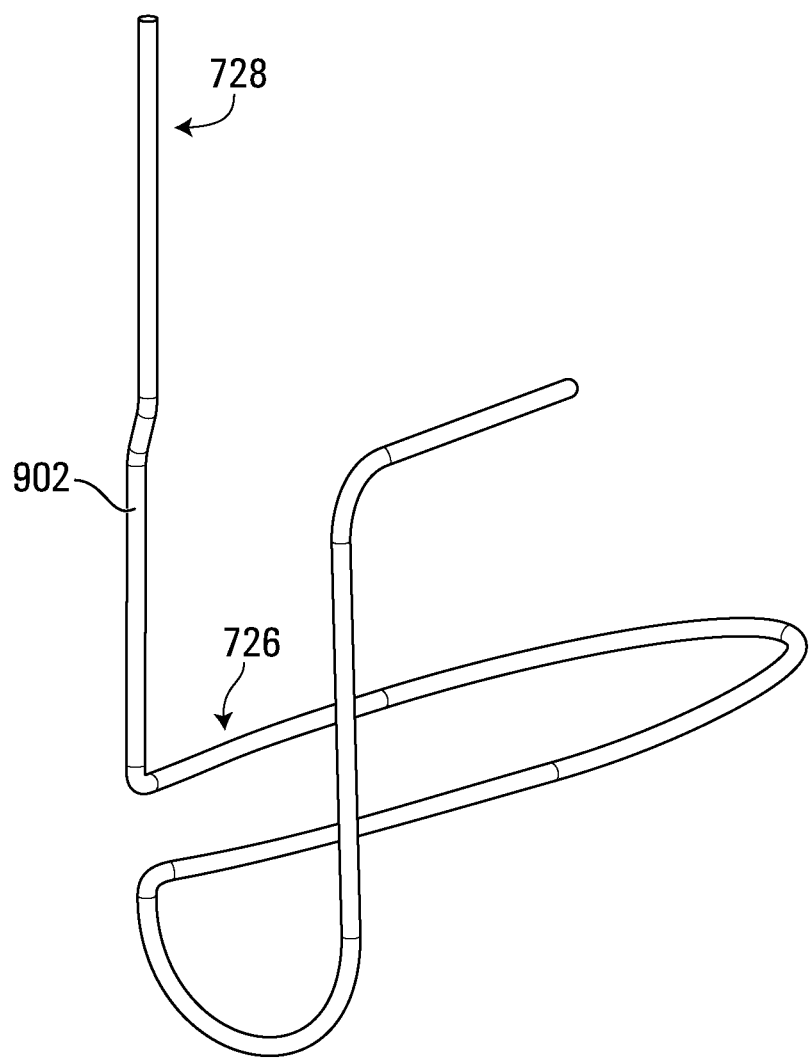
FIG. 9 is a perspective view of a circulation tube and a percolation tube of the cooling unit shown in FIG. 7.

FIG. 9 is a perspective view of the circulation tube 726 and the percolation tube 728. The circulation tube 726 and the percolation tube 728 are functionally similar to the circulation tube 208 and percolation tube 208 shown in FIG. 2. In this embodiment, the circulation tube 726 and the percolation tube 728 are formed by a pipe 902, which has an inner diameter of approximately 0.188 inches, has an internal volume of approximately 1.61 cubic inches, and has a length of approximately 56.79 inches.

Figure 10:
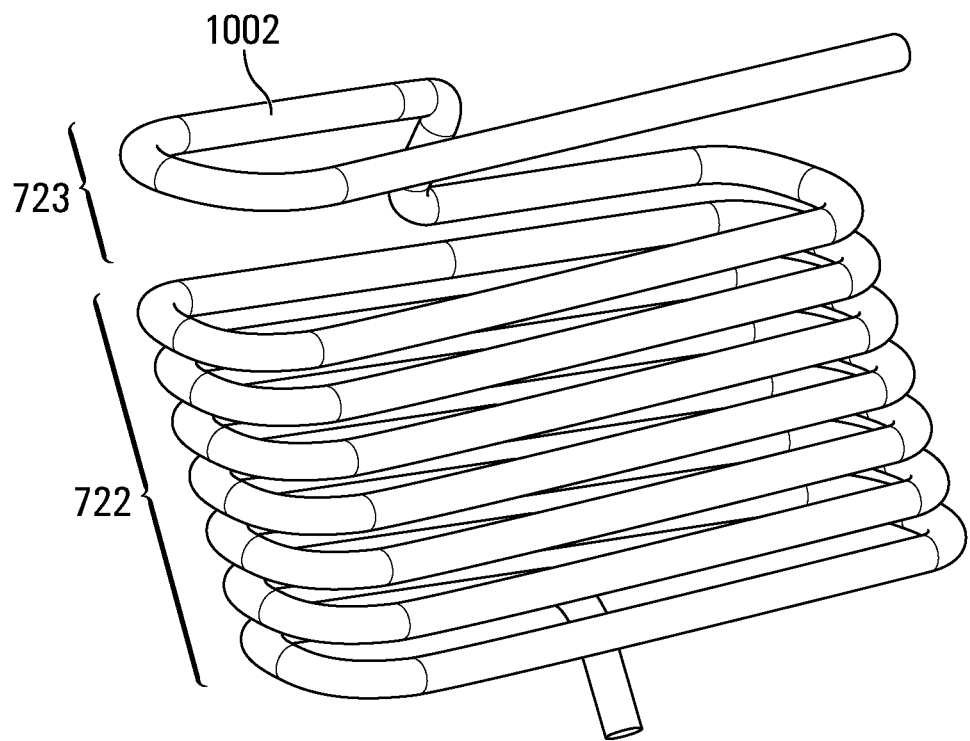
FIG. 10 is a perspective view of an absorber and an evaporator of the cooling unit shown in FIG. 7.

FIG. 10 is a perspective view of the absorber 722 together with the coil portion 723 of the evaporator 720 shown in FIG. 7. The absorber 722 and the coil portion 723 of the evaporator 720 may be collectively referred to as an absorber coil. In this embodiment, the absorber 722 and the coil portion 723 of the evaporator 720 are formed by a pipe 1002 that has a coil formation. The coil portion 723 of the evaporator 720 (part of pipe 1002) is a partial loop of the coil formation that is raised and somewhat separated from the remaining coil of the absorber 722. The pipe 1002 has an inner diameter of approximately 0.375 inches, has an internal volume of approximately 21.9 cubic inches, and has a length of approximately 198.5 inches. As can be seen in FIGS. 7 and 10, the absorber coil is angled and shaped to fit against the inclined/elliptical contour of the solar concentrator 706 shown in FIG. 7.

Figure 11:
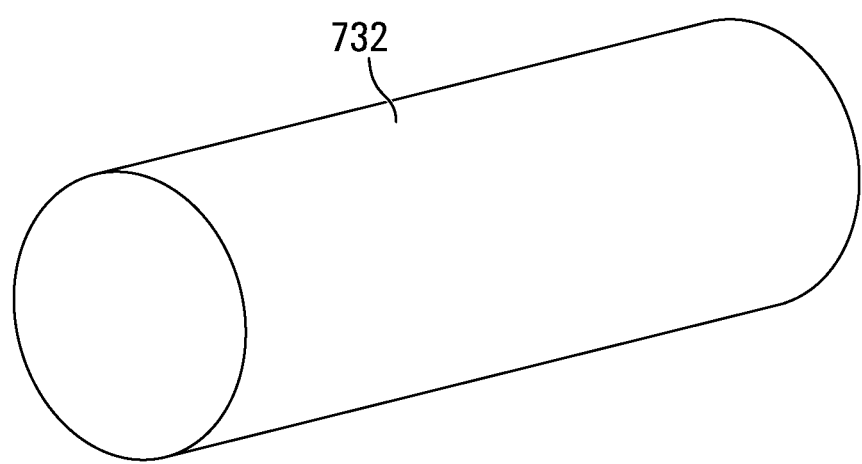
FIG. 11 is a perspective view of an absorber tank of the cooling unit shown in FIG. 7.

FIG. 11 is a perspective view of the absorber tank 732. In this embodiment, the absorber tank 732 has an inner diameter of approximately 1.875 inches, has an internal volume of approximately 16.84 cubic inches, and has a length of approximately 6 inches.

Figure 12:
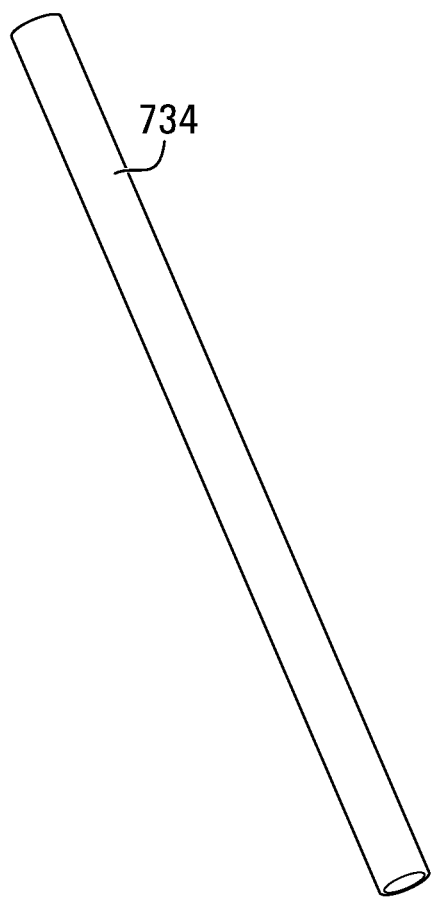
FIG. 12 is a perspective view of vapour return tube of the cooling unit shown in FIG. 7.

FIG. 12 is a perspective view of the vapour return tube 734. In this embodiment, the vapour return tube 734 has an inner diameter of approximately 0.313 inches, has an internal volume of approximately 0.55 cubic inches, and has a length of approximately 7.15 inches.

Figure 13:
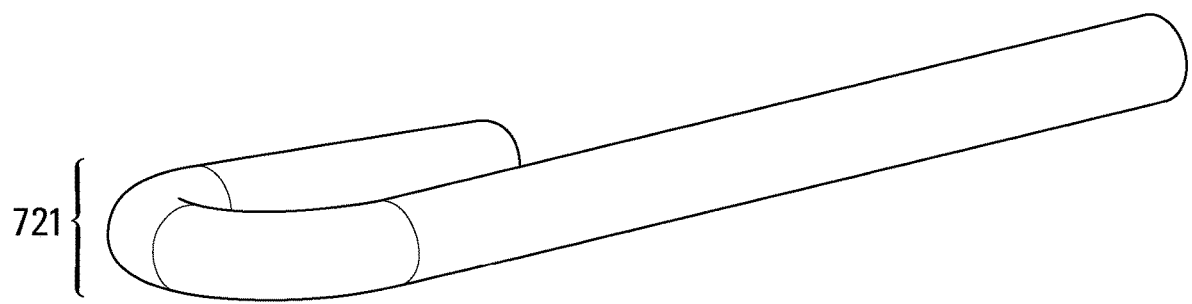
FIG. 13 is a perspective view of a cooling bar of the cooling unit shown in FIG. 7.

FIG. 13 is a perspective view of a component 721 of the evaporator 720 (shown in FIG. 7) referred herein to as a "cooling bar". The cooling bar 721 has an inner diameter of approximately 0.75 inches, has an internal volume of approximately 8.1 cubic inches, and has a length of approximately 18.31 inches. The cooling bar 721 enters the venting hood 760 from one side and passes substantially through the length of the venting hood 760. Referring back to FIG. 7, the condensing liquid ammonia enters the cooling bar 721 from the condenser drain tube 717. The cooling bar 721 is functionally connected to the absorber coil. Specifically, the coil portion 723 of the evaporator 720 (formed by pipe 1002 shown in FIG. 10) is at least partially inside the cooling bar 721 such that evaporating ammonia passes into that coil portion 723 of the evaporator 720 to continue through the absorber coil. The condensing liquid ammonia in the cooling bar 721 may be freezing cold.

Figure 14:
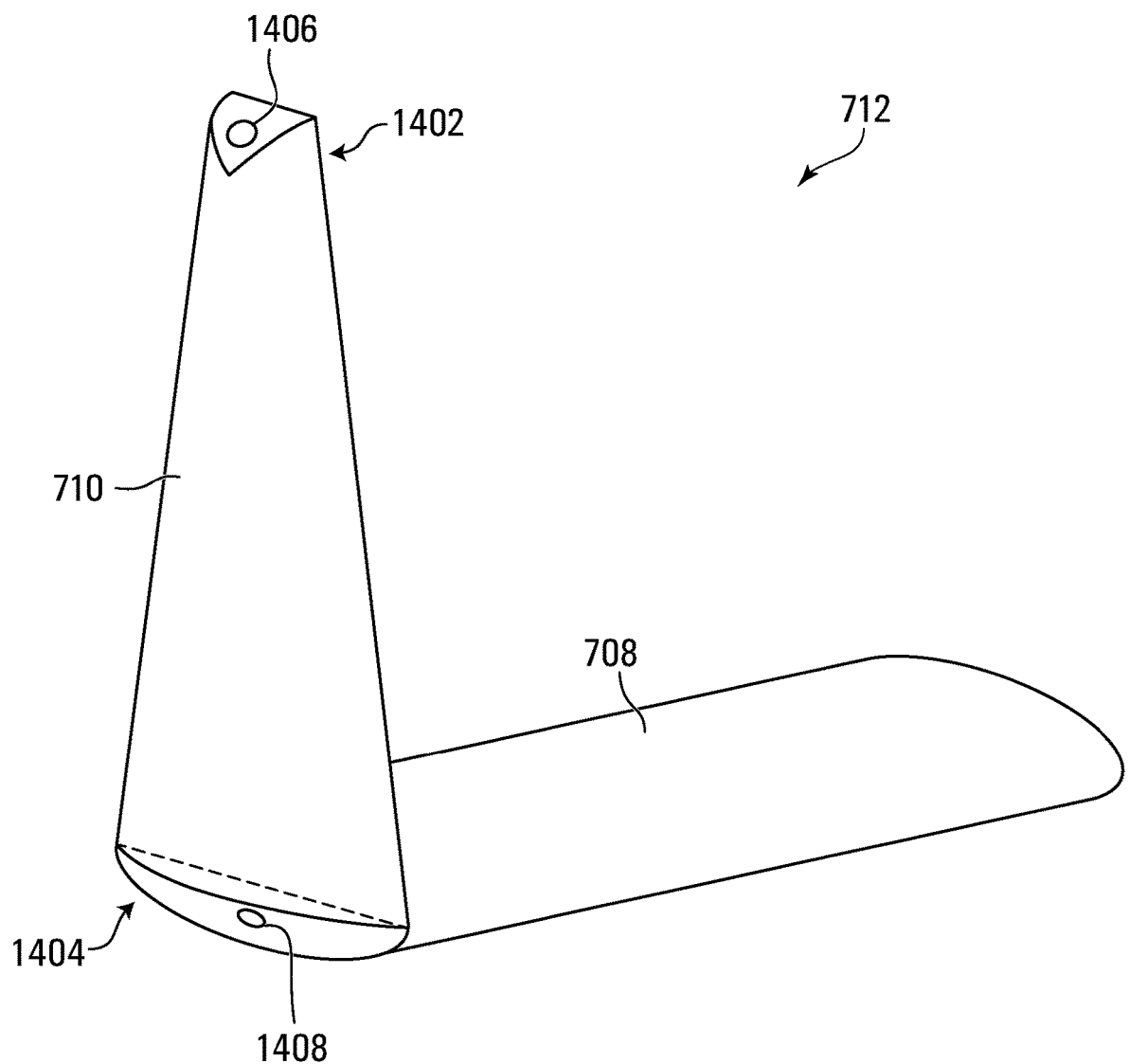
FIG. 14 is a perspective view of an oil heating chamber of the cooling unit shown in FIG. 7.

FIG. 14 is a perspective view of the oil heating chamber 712. The oil heating chamber 712 in this embodiment has an internal volume of 140 cubic inches. The oil heating chamber 712 holds oil, the thermal fluid to be heated by solar energy in this embodiment. The heating bar 708 of the oil heating chamber 712 has an elliptical cross section, where the elliptical shape where its width (horizontal and perpendicular to the longitudinal axis of the bar as shown in the Figure) is greater than its height (vertical in the Figure). The thermal fluid expansion chamber 710 is in fluid communication with the heating bar 708. The thermal fluid expansion chamber 710 has an upper end 1402 and a lower end 1404. The lower end 1404 of the thermal fluid expansion chamber 710 matches the horizontal width of the heating bar 708 and the thermal fluid expansion chamber 710 tapers to the narrower upper end 1402. The upper end 1402 of the thermal fluid expansion chamber 710 has an upper opening 1406 and the lower end 1404 has a lower opening 1408. The upper opening 1406 and the lower opening 1408 are configured to allow the backflow column 718 and the percolation tube 728 to enter and exit the thermal fluid expansion chamber 710. The oil heating chamber 712 in this embodiment has a volume of 140 cubic inches.

Figure 15:
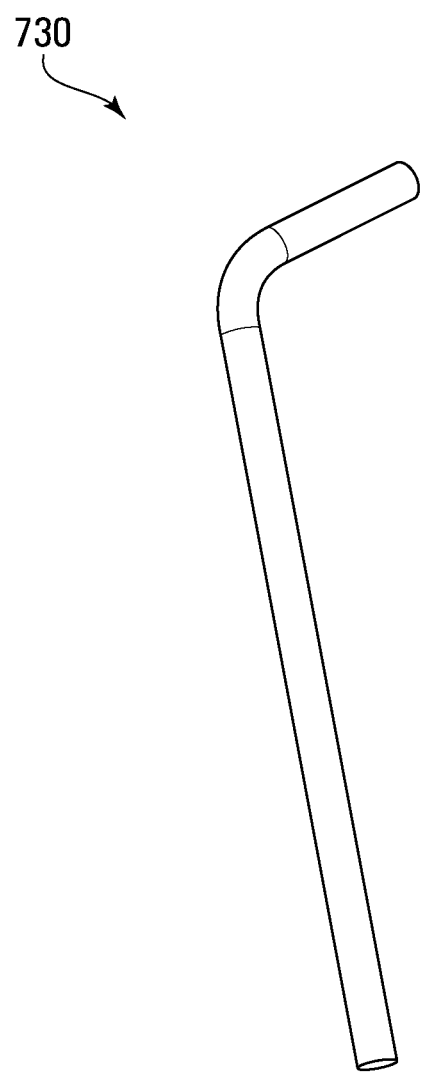
FIG. 15 is a perspective view of a weak solution return tube of the cooling unit shown in FIG. 7.

FIG. 15 is a perspective view of the weak solution return tube 730, which is a pipe having an inner diameter of approximately 0.188 inches, has an internal volume of approximately 0.18 cubic inches, and has a length of approximately 6.5 inches.

Figure 16:
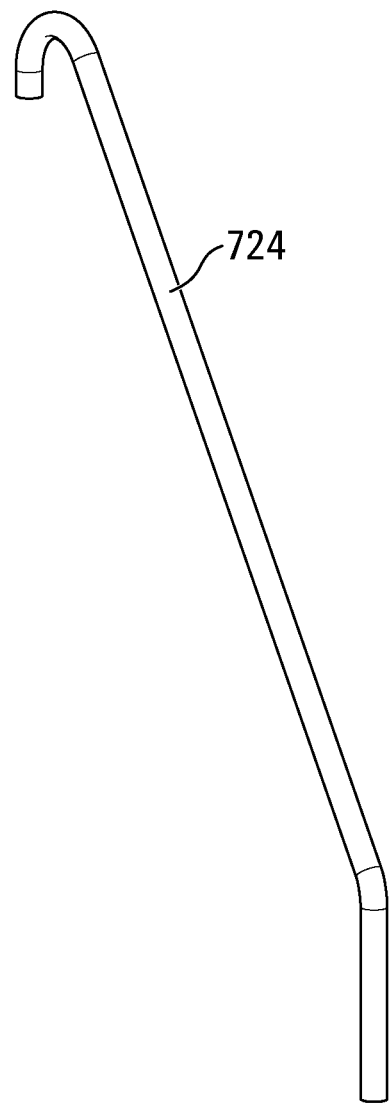
FIG. 16 is a perspective view of a vent tube of the cooling unit shown in FIG. 7.

FIG. 16 is a perspective view of the vent tube 724 (which may also be referred to as a condenser vent tube). The condenser vent tube 724 in this embodiment is a pipe having an inner diameter of approximately 0.188 inches, has an internal volume of approximately 0.32 cubic inches, and has a length of approximately 7.5 inches.

Figure 17:
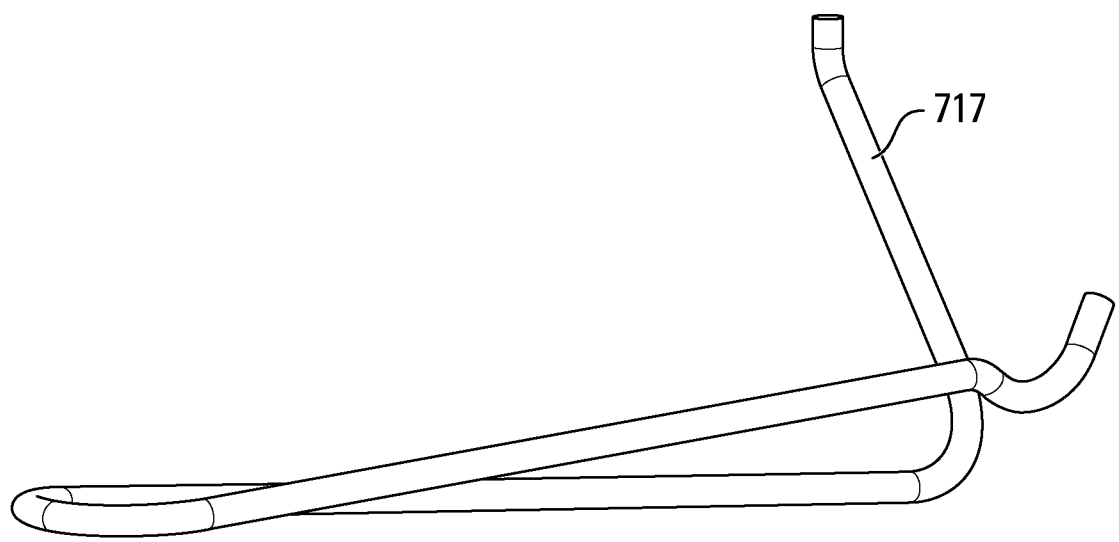
FIG. 17 is a perspective view of a condenser drain tube of the cooling unit shown in FIG. 7.

FIG. 17 is a perspective view of the condenser drain tube 717, which is a pipe having an inner diameter of approximately 0.188 inches, has an internal volume of approximately 0.76 cubic inches, and has a length of approximately 30.56 inches.

Figure 18:
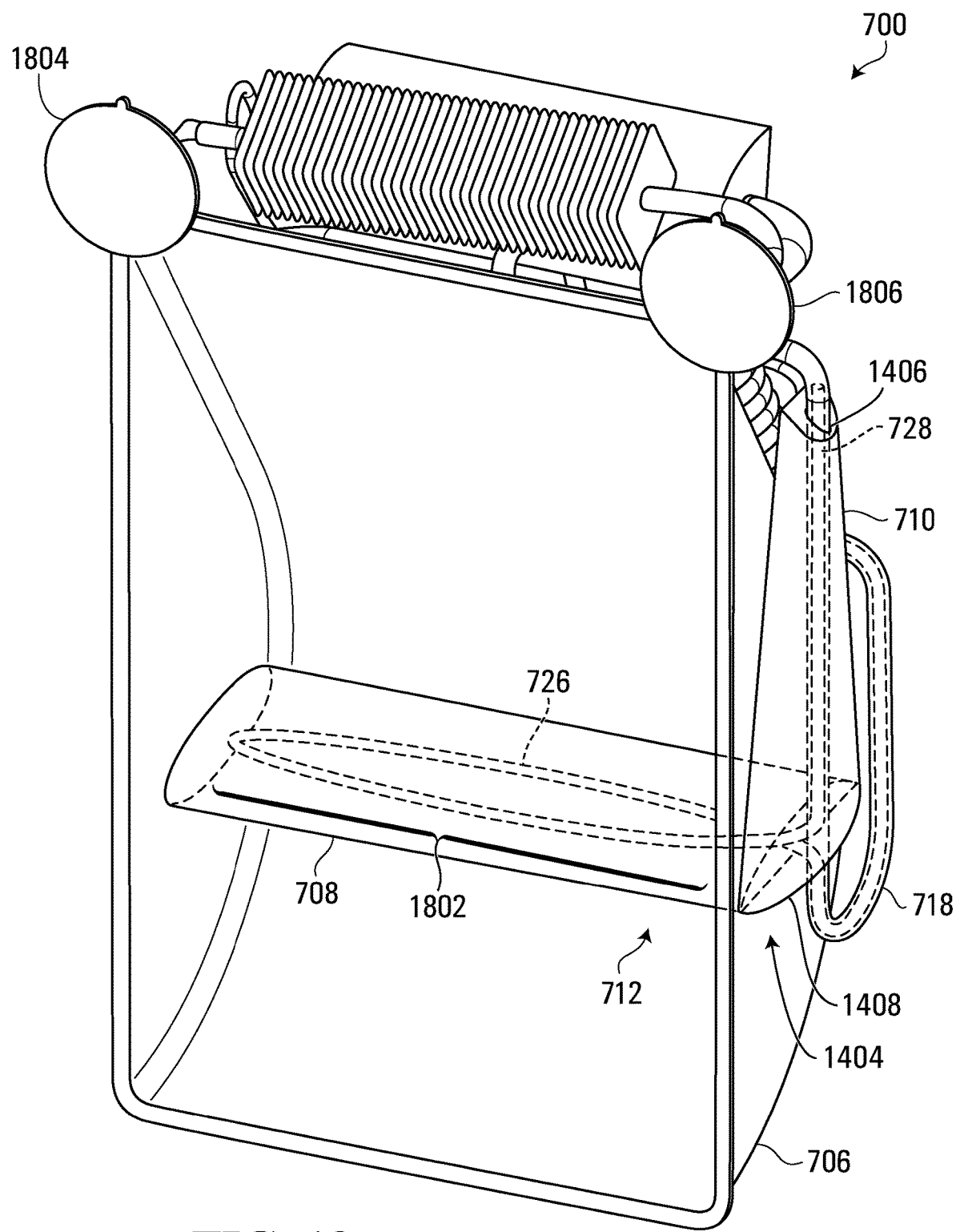
FIG. 18 is a perspective view of a condenser and a backflow column of the cooling unit shown in FIG. 7.

FIG. 18 is a rear perspective view of the cooling unit 700 shown in FIG. 7. In FIG. 18, the heating bar 708 of the oil heating chamber 712 is visible within the solar concentrator 706. The circulation tube 726 and the percolation tube 728 are shown in stippled lines extending within the oil heating chamber 712 and the backflow column 718. As shown, the circulation tube 726 exits the backflow column 718 near the lower end 1404 of the thermal fluid expansion chamber 710, makes a large loop 1802 that extends lengthwise within substantially the entire length of the heating bar 708 and then re-enters the backflow column 718. The circulation tube 726 then extends vertically, becoming the percolation tube 728. The percolation tube 728 and the backflow column 718 exit upward through the upper opening 1406 of the thermal fluid expansion chamber 710. The circulation tube 726, after re-entering the backflow column 718 from an opposite end of the loop 1802, initially extends downward and exits the lower opening 1408 of the thermal fluid expansion chamber 710 together with the backflow column 718. Also shown in FIG. 18 are suction cups 1804 and 1806 that, in this embodiment, may be used to affix the cooling unit 700 to a window. In other embodiments, the cooling system may also be adapted to be suspended on a wall or another vertically oriented surface.

FIG. 19 is a front view of the cooling unit 700 of FIG. 7 including the concentrator heating component 702, the absorption cooling system 704 and the venting hood 760 as described above. As shown in FIG. 19, venting hood 760 includes a shroud 762, distribution fins 764 and a fan 766 that are similar to the shroud 362, the distribution fins 364 and the fan 366 shown in FIG. 4A. The cooling bar 721 passes through the venting hood 760 to cool the distribution fins 764, which in turn cools air around the distribution fins 764. The fan 766 may then circulate the air over the distribution fins 764 to be cooled. The air may then exit the venting hood 760, in a manner similar to the venting hood 360 shown in FIGS. 3A, 3B, 4A and 4B.

Figure 20:
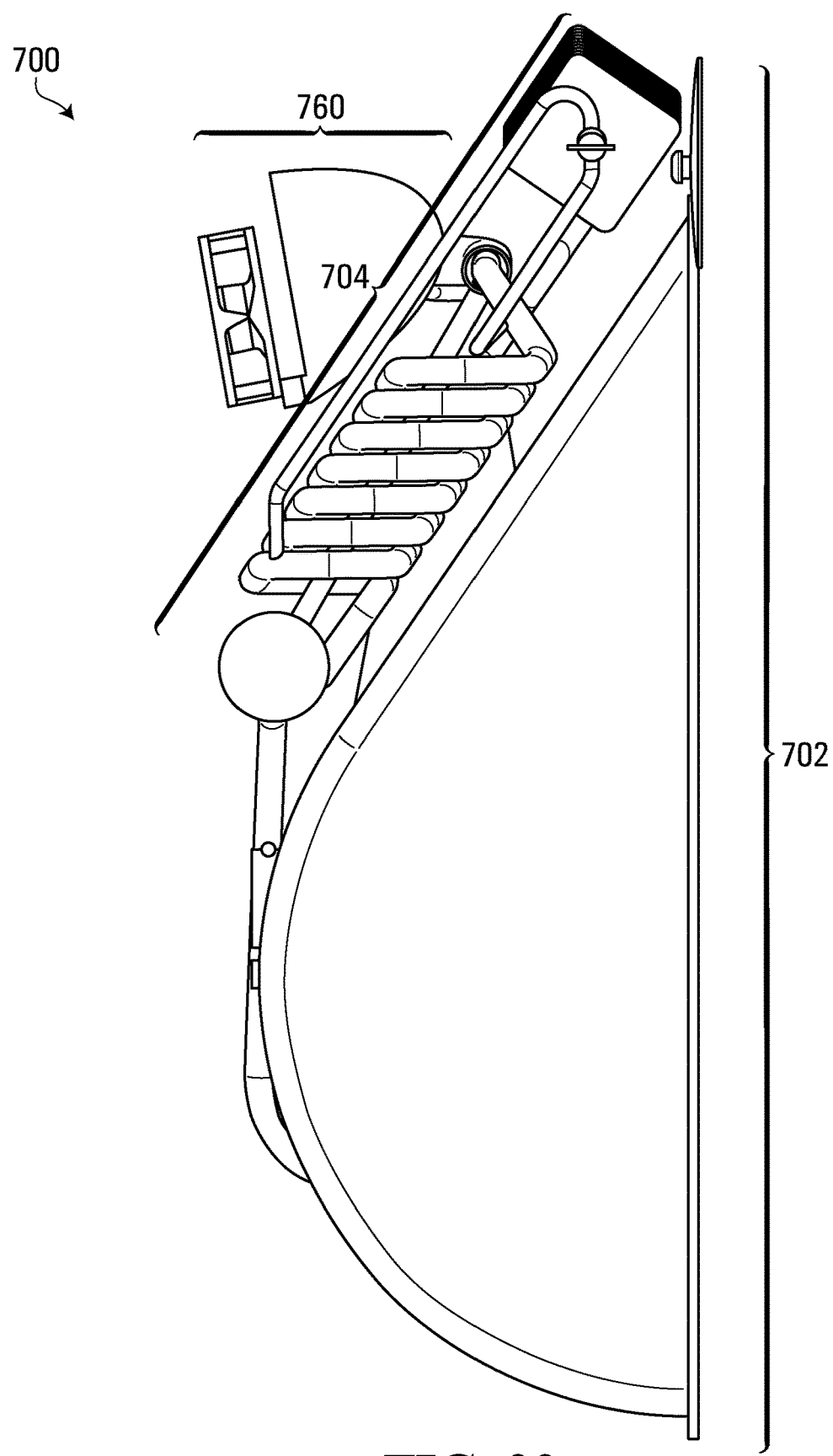
FIG. 20 is a side view of the cooling unit shown in FIGS. 7 and 19.

FIG. 20 is a side view of the cooling unit 700 shown in FIG. 7 including the concentrator heating component 702, the absorption cooling system 704 and the vent hood 760 as described above.

In the embodiments shown in FIGS. 2, 3A and 3B, and 7, the solar heating component includes a horizontally-oriented heating bar 236/336. Other embodiments include vertically-oriented solar heating components. An example of a cooling system that includes a solar heating component with a vertically-oriented heating bar will now be described with reference to FIG. 21.

Figure 21:
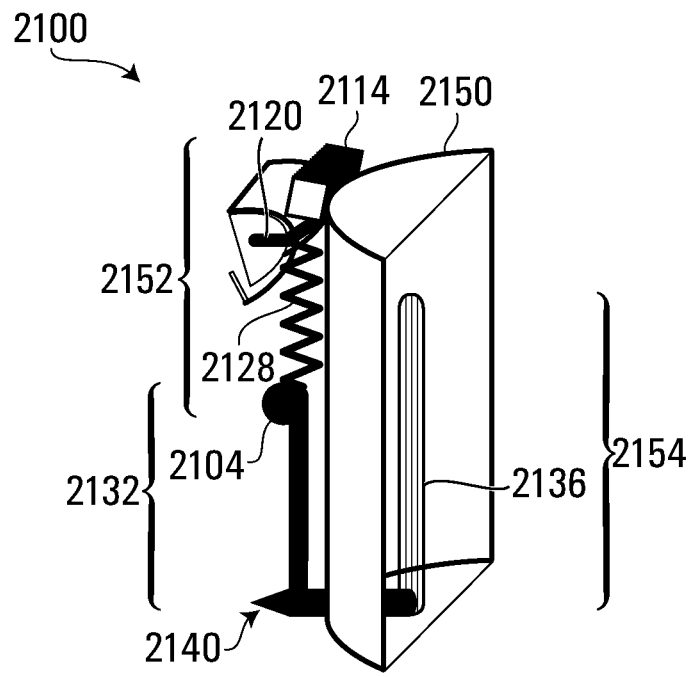
FIG. 21 is a perspective view of a cooling unit in accordance with another embodiment of the present invention.

FIG. 21 is a perspective schematic view of a cooling unit 2100 in accordance with another embodiment of the present invention. The cooling unit 2100 shown in FIG. 21 includes an absorption cooling system 2152 and a solar heating component 2154.

The absorption cooling system 2152 shown in FIG. 21 includes an absorber tank 2104, a boiler 2132, a condenser 2114, an evaporator 2120, and an absorber 2128 that are functionally connected to carry out an absorption cooling process when heat is applied to the bottom of the boiler 2132.

The solar heating component 2154 includes a vertically-oriented solar concentrator 2150, and an evacuated solar collector tube 2136 that is positioned so that it extends substantially parallel along a length of a focal zone of vertically-oriented solar concentrator 2150. In this example embodiment, the evacuated solar collector tube 2136 includes at least one heat-conducting rod (not shown) that extends at least partially through an interior of the tube. The heat-conducting rod is functionally connected to a heat-conducting extension (not shown) and the tip of the heat-conducting extension extends into a bottom 2140 of the boiler 2132 to heat the rich ammonia solution. The heat-conducting rod and the heat-conducting extension are each made of copper in this example, although other heat-conducting materials (such as other metals) are possible. The copper rod and the copper extension in this example carry heat to the bottom of the water/ammonia mixture at the bottom 2140 of the boiler 2132. This example embodiment uses the evacuated solar collector tube 2136, instead of heating fluid in a heating bar or reservoir. In this case there is no such reservoir. Therefore in this variation, boiler 2132 of absorption cooling system 2152 does not include a circulation tube nor a heating bar nor a thermal fluid expansion chamber 2140 as described with respect to FIGS. 2, 3A and 3B.

In operation, cooling unit 2100 operates in a similar manner as cooling unit 300, such that solar radiation reflected and concentrated by vertically-oriented solar concentrator 2150 on vertically-oriented evacuated solar collector tube 2136 (rather than a fluid filled bar) is converted to heat to drive the absorption cooling process of the absorption cooling system 2152.

An evacuated solar collector tube, such as the vertically-oriented evacuated solar collector tube 2136 shown in FIG. 21 is distinctly structurally different than the horizontally-oriented heating bar 336 shown in FIGS. 3A and 3B, but otherwise plays a similar role as the heating bars in 3A and 3B in gathering and conducting heat to activate the adsorption process. As such, the use of one or more evacuated solar collector tubes can be applied in some embodiments instead of a fluid filled bar, just as the fluid filled bar could be substituted in the system shown as FIG. 21. An evacuated solar collector tube may be able to quickly heat up in the presence of solar energy such that the system can quickly generate cooling.

A fluid filled heating bar may also be vertically oriented similar to the evacuated solar collector tube 2136 shown in FIG. 21.

In the embodiments shown in FIGS. 3A, 3B, 7 and 21, the solar heating components 354, 702 and 2154 include a single heating bar or evacuated solar collector tube positioned to absorb solar radiation reflected from a solar concentrator with a single trough. More generally, solar concentrator based heating components include at least one heating bar and at least one trough-shaped reflector configured to concentrate solar radiation on the at least one heating bar.

Figure 22:
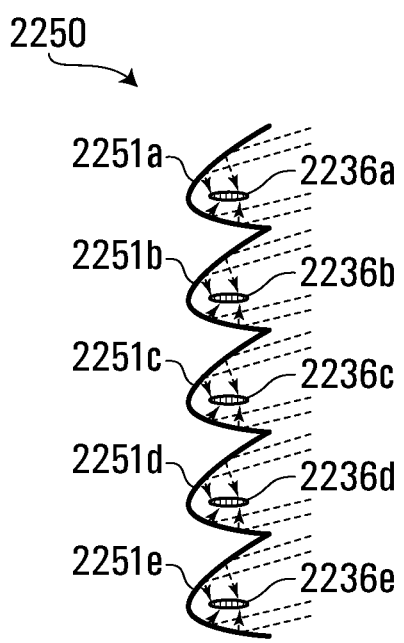
FIG. 22 is a side view of a multi-trough horizontal solar concentrator in accordance with another embodiment of the present invention.
Figure 23:
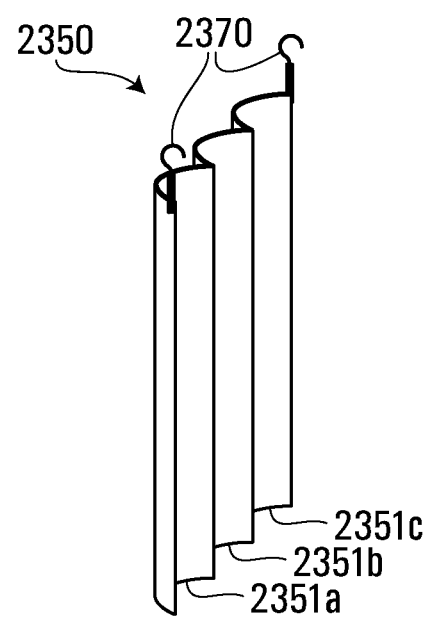
FIG. 23 is a perspective view of a multi-trough vertical solar concentrator in accordance with another embodiment of the present invention.

Examples of solar concentrators having a plurality of troughs are shown in FIGS. 22 and 23. In particular, FIG. 22 is a side view of a multi-trough horizontal solar concentrator 2250 in accordance with an embodiment of the present invention and FIG. 23 is a perspective view of a multi-trough vertical solar concentrator 2350 in accordance with another embodiment of the present invention.

The multi-trough horizontal solar concentrator 2250 shown in FIG. 22 includes five reflective troughs 2251a to 2251e. As shown in FIG. 22, each reflective trough is configured to reflect and concentrate solar radiation onto respective horizontal heating bars 2236a to 2236e. Evacuated solar collector tubes may be used in place of or together with horizontal heating bars 2236a to 2236e. Similarly, the multi-trough vertical solar concentrator 2350 includes three reflective troughs 2351a to 2351c, each of which is configured to reflect and concentrate solar radiation onto a respective vertical heating bar and/or evacuated-air tubes (not shown in FIG. 23). FIG. 23 also shows how support elements 2370 may be integrated with multi-trough vertical solar concentrator 2350 to support its mounting or suspending in a window, on a wall or another vertical surface.

While the embodiments described above feature horizontally-oriented or vertically-oriented solar heating components, embodiments of the present invention are not limited to such orientations. For example, embodiments of the present invention may include heating components with a combination of horizontal and vertical solar heating components and/or solar heating components oriented at intermediate angles.

In addition, while the embodiments described above with reference to FIGS. 2 to 23 include solar heating components that are based on solar concentrator(s) and heating bar(s), embodiments of the present invention are not limited to solar concentrator based heating components. For example, some embodiments of the present invention utilize other forms of heat collectors including, for example, a panel solar collector (such as a flat panel, for example) to generate heat to drive an absorption cooling system.

An example of an air cooling system that utilizes a flat panel solar collector based heating component will now be described with reference to FIGS. 24A to 24C.

Figure 24A:
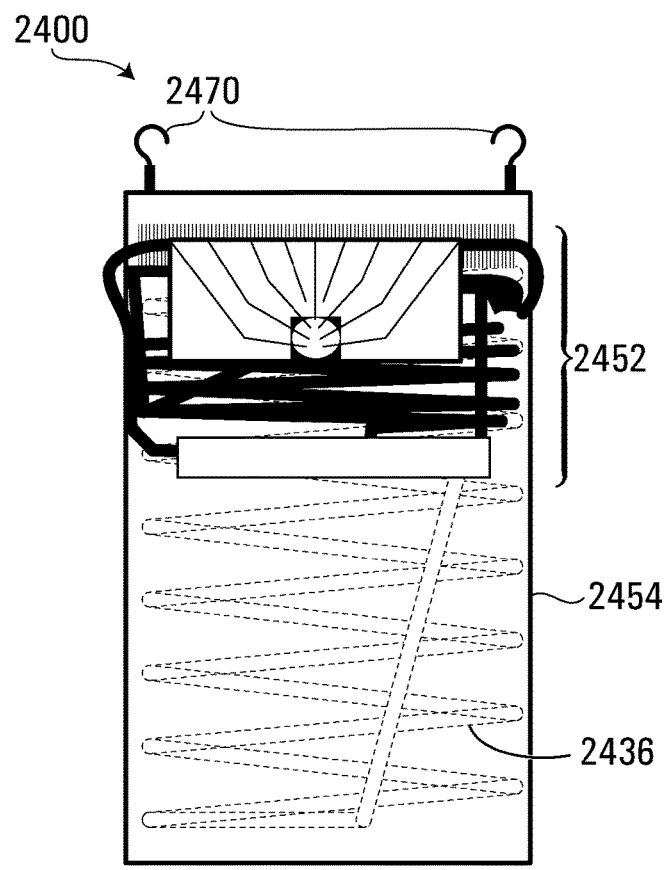
FIG. 24A is a rear view of a cooling unit with a flat panel solar collector heating component in accordance with another embodiment of the present invention.
Figure 24B:
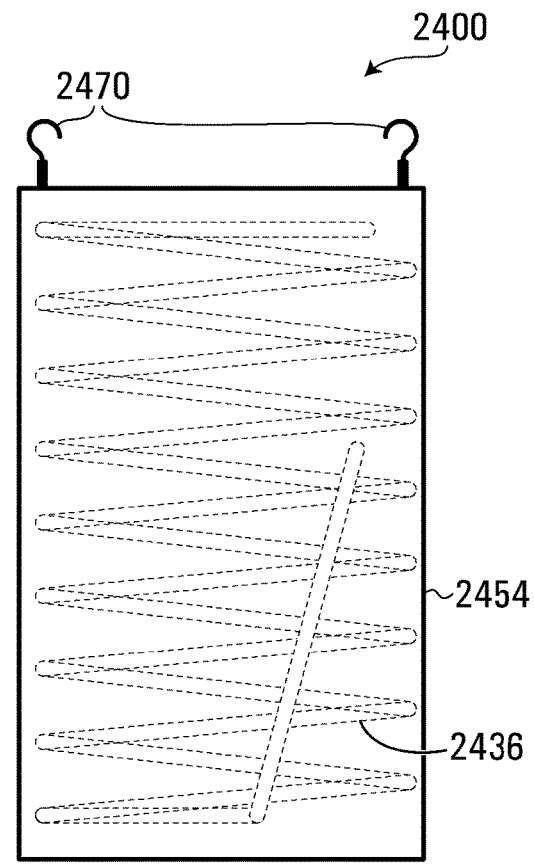
FIG. 24B is a front view of the cooling unit shown in FIG. 24A.
Figure 24C:
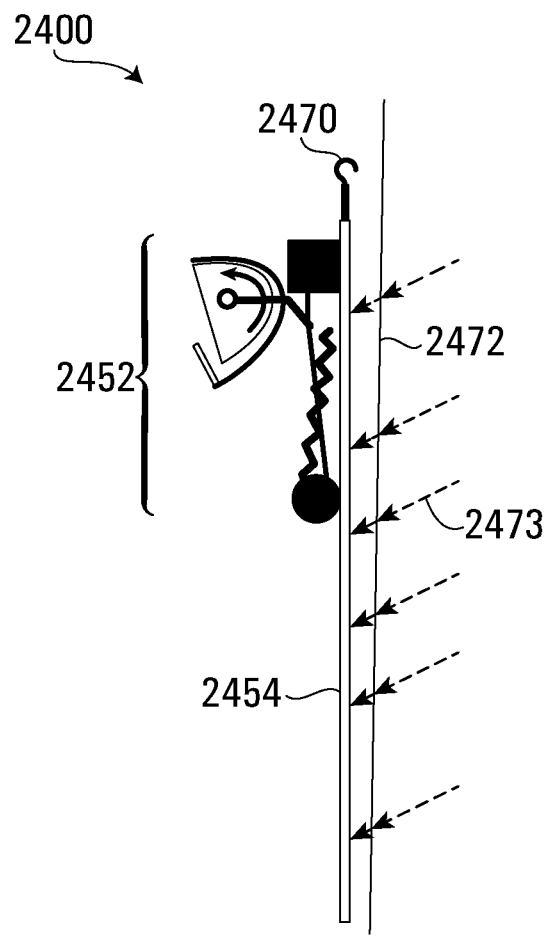
FIG. 24C is a side view of the cooling unit shown in FIGS. 24A and 24B.

FIGS. 24A, 24B and 24C provide a rear view, a front view and a side view, respectively, of a cooling unit 2400 with a flat panel solar collector heating component 2454 in accordance with another embodiment of the present invention. The solar collector heating component may not be flat in other arrangements. The cooling unit 2400 includes an absorption cooling system 2452 that is similar to the absorption cooling systems 352 and 704 shown in FIGS. 3A, 3B and 7. However, in this embodiment the boiler of the absorption cooling system 2452 includes a circulation tube 2436 that extends in a coiled pattern through an internal portion of flat panel solar collector heating component 2454. Cooling unit 2400 also includes support elements 2470 for mounting the unit in a window 2472. As discussed above, cooling systems described herein may also be adapted to be suspended on other vertical surfaces, such as walls.

In operation, a rich solution of refrigerant and absorbent circulates through flat panel solar collector heating component 2454 via circulation tube 2436. Flat panel solar collector heating component 2454 absorbs solar radiation 2473 incident on its outer surface and converts it to heat that is absorbed by the rich solution of refrigerant and absorbent circulating through circulation tube 2436. In this way the heat generated by flat panel solar collector heating component 2454 is used to drive the absorption cooling process of the absorption cooling system 2452.

The flat panel solar collector heating component 2454 shown in FIGS. 24A to 24C utilizes the direct conversion of solar radiation to heat in order to drive the absorption cooling process. However, in some embodiments, rather than having the solution circulate throughout the flat panel solar collector to absorb heat, the flat panel solar collector may include a plurality of photovoltaic cells configured to absorb solar radiation and convert the solar radiation to electricity to power the cooling element to generate cooling directly. In some embodiments, the photovoltaic cells may be at least semi-transparent so that the flat panel solar collector can be mounted or suspended in a window without completely obstructing the view through the window.

In some embodiments, a flat panel solar collector heating component (such as flat panel solar collector heating component 2454 shown in FIGS. 24A to 24C) is configured to be set into an outer wall of a structure (such as an apartment or other building structure, which is not shown). An absorption cooling system (such as absorption cooling system 2452 shown in FIGS. 24A to 24C) may include a functional connection from the absorption cooling system, through the outer wall, to the flat panel solar collector heating component. Thus, the absorption cooling system may be inside and the flat panel solar collector heating component may be outside. For example, electrical wires or cables could connect the flat panel solar collector heating component to the absorption cooling system through the wall. Other elements (such as a fan) powered by the flat panel solar collector heating component could also be electrically connected.

In some embodiments, the cooling element of the system includes a thermoelectric cooling system. The thermoelectric cooling system may include one or more thermoelectric component (such as a thermoelectric plate).

In some embodiments, energy generated by the solar energy gathering component is electricity. For example, photovoltaic cells may be used to convert solar energy into electricity to drive the cooling system. However, embodiments are not limited to flat panels or to photovoltaic cell arrangements and other solar energy collectors that generate electricity may be utilized.

Figure 25A:
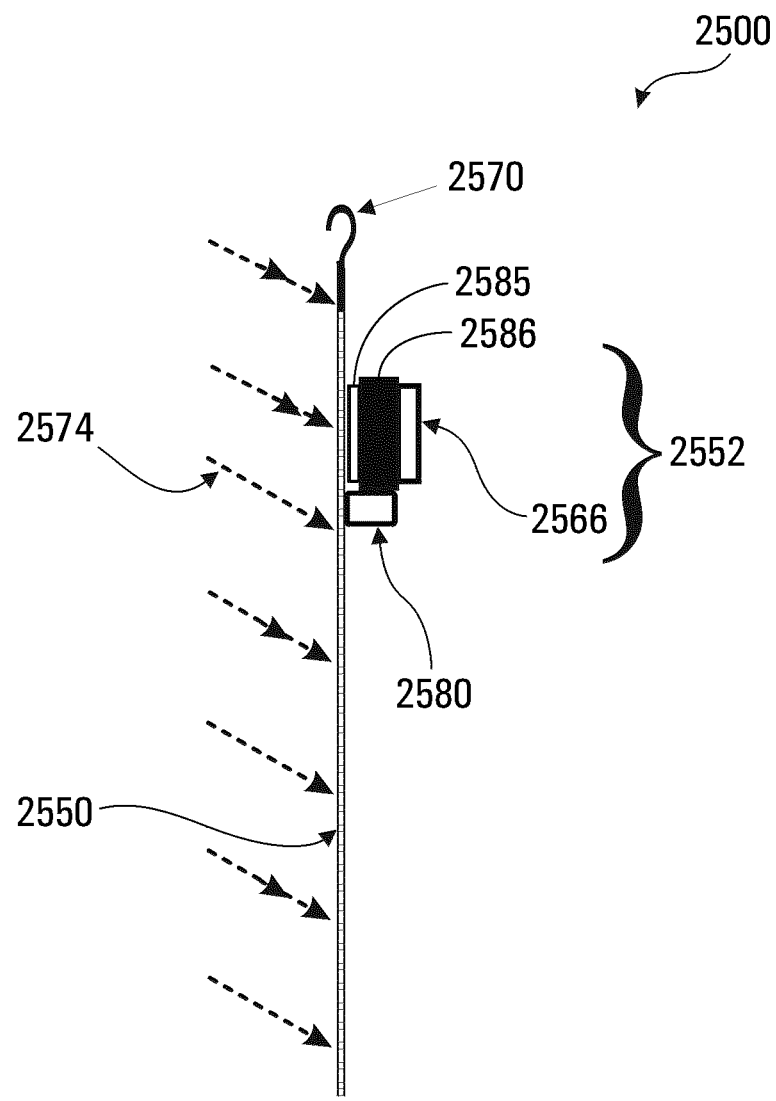
FIG. 25A is a side view of a cooling unit with a flat panel photovoltaic collector according to another embodiment.
Figure 25B:
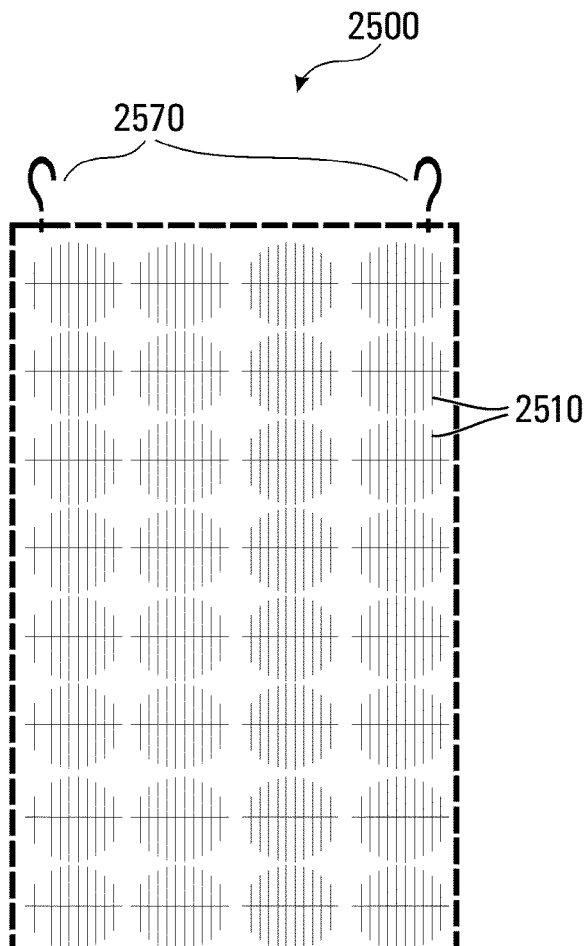
FIG. 25B is a front view of the cooling unit shown in FIG. 25A.
Figure 25C:
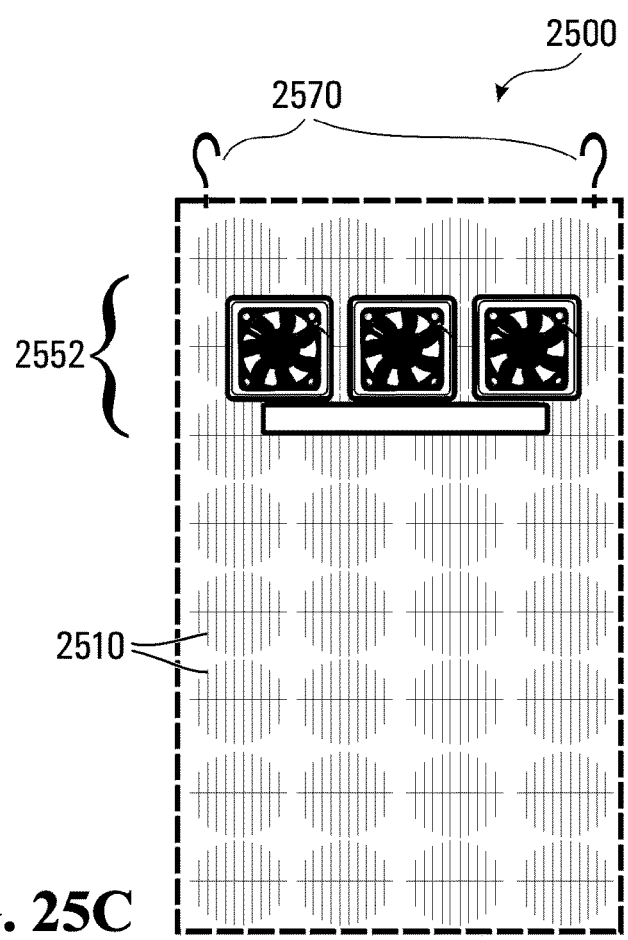
FIG. 25C is a rear view of the cooling unit shown in FIGS. 25A and 25B.

FIGS. 25A, 25B and 25C illustrate another embodiment of the present invention. FIG. 25A is a side view of a cooling unit 2500 for suspending in a window, on a wall or another vertical surface. The cooling system 2500 includes with a flat panel photovoltaic collector 2550, which includes a plurality of photovoltaic cells 2510 (shown in FIGS. 25B and 25C), that uses energy from the sun's rays 2574 to provide electricity to operate a cooling mechanism or system 2552. In other embodiments, the panel photovoltaic collector is not necessarily flat. The combined cooling mechanism 2552 is composed of a thermoelectric component 2585 that provides cooling, a thermal conductor component 2586, a fan 2566 and an optional back-up battery 2580. Various conventional thermoelectric cooling components are known in the art and may be utilized as the thermoelectric component 2585 shown in FIG. 25A. The thermal conductor component 2586 is arranged on a cool side of the thermoelectric component 2585 to distribute cooling from the thermoelectric component 2585. The fan 2566 in this embodiment is arranged against the thermal conductor component 2586 in order to distribute air that is cooled by the thermal conductor component 2586. A fan and/or a thermal conductor component are not necessarily included in all embodiments.

Cooling unit 2500 also includes support elements 2570 for mounting or suspending the cooling unit 2500 in a window (or other vertical surface). The combined cooling mechanism 2552 may be removable and may be operated in other areas through extended lengths of electrical wires connected to the flat panel photovoltaic collector 2550.

FIG. 25B is a front view of the cooling unit shown in FIG. 25A as it may be seen from outside the window it rests in. The photovoltaic cells 2510 are shown in FIGS. 25A and 25B. The photovoltaic cells 2510 may be any photovoltaic cells suitable for generating quantities of electricity sufficient to drive the thermoelectric component 2585. The thermoelectric component 2585 may be any suitable component using thermoelectric properties to generate cooling.

FIG. 25C is a rear view of the cooling unit 2500 shown in FIGS. 25A and 25B, as it may be seen inside the room where it would be hanging in a window.

Figure 26:
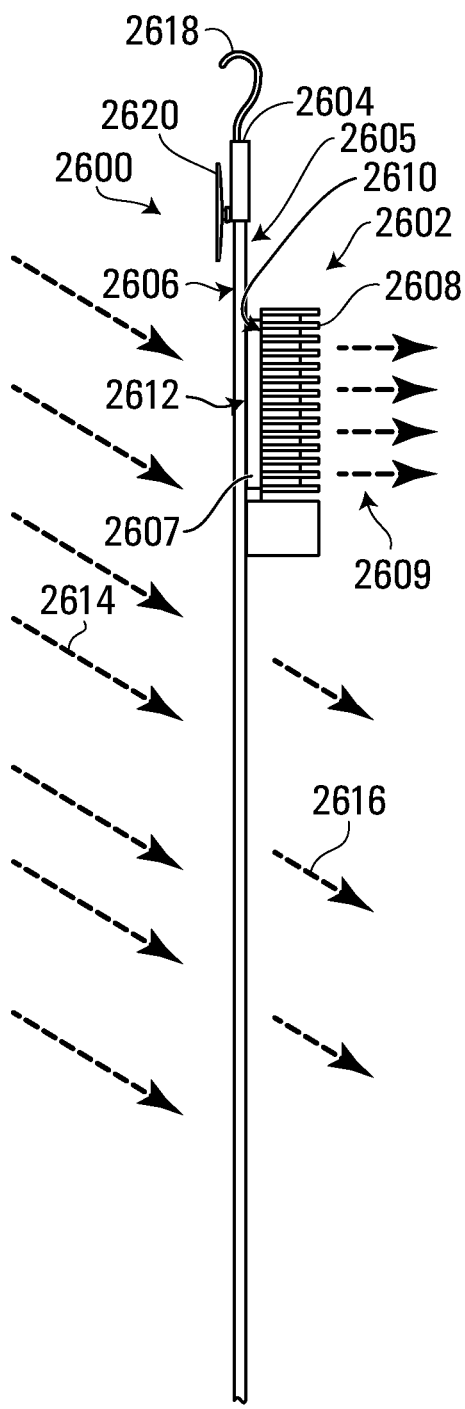
FIG. 26 is a side view of a cooling unit for mounting or suspending in a window, on a wall or on another vertically oriented surface, including a thermoelectric cooling system, in accordance with another embodiment.

FIG. 26 is a side view of a cooling unit 2600 for mounting or suspending in a window (or another vertical surface) in accordance with another embodiment. The cooling unit 2600 includes a thermoelectric cooling system 2602 to generate cooling and a plurality of photovoltaic cells (not shown) on a solar collector, specifically flat panel photovoltaic collector 2604 in this embodiment. The flat panel photovoltaic collector 2604 functions similar to the flat panel photovoltaic collector 2550 shown in FIGS. 25A to 25C. Again, non-flat panel collectors may also be used. The flat panel photovoltaic collector 2604 has a first surface 2605 and a second surface 2606 that is opposite to the first surface 2605. The photovoltaic cells generate electricity from solar power to drive the thermoelectric cooling component 2602. The thermoelectric cooling system 2602 includes a thermoelectric component 2607. The thermoelectric component 2607 is attached to the first surface 2605 of the flat panel photovoltaic collector 2604. The cooling unit 2600 also includes a fan 2608 to distribute air 2609 that is cooled by the thermoelectric cooling component 2602. The thermoelectric cooling component 2607 in this embodiment is a thermoelectric plate, such as a Peltier plate, having a cool side 2610 and a hot side 2612. The fan 2606 is attached to the cool side 2610 of the thermoelectric cooling component 2607. Thus the air 2609 that is cooled by the cool side 2610 will be distributed by the fan 2606.

In this embodiment, the flat panel photovoltaic collector 2604 includes electrical connections (not shown) for connecting an electrical output of the photovoltaic cells to the photoelectric component 2607. Any suitable means for electrical connection, such as conductive wiring, may be utilized.

When the cooling unit 2600 is mounted or suspended in a window (not shown) and in operation, solar light (indicated by arrows 2614) strikes the flat panel photovoltaic collector 2604. Some of the light is absorbed by the photovoltaic cells and transformed into electricity. The flat panel photovoltaic collector 2604 in this embodiment is at least semi-transparent so that at least some solar energy (indicated by arrows 2616) may pass through the flat panel photovoltaic collector 2604. In this manner, the flat panel photovoltaic collector may allow at least some visible light from the sun through the flat panel photovoltaic collector 2604. Thus, the cooling unit 2600 may allow some light to pass through the window and into a room even when the cooling unit 2600 is mounted in the window. The flat panel may be comprised of, or coated with, a material that allows a desired amount of light and/or reflects some or all solar energy that does not directly strike photovoltaic cells. Embodiments are not limited to a particular type of solar collector design.

The cooling unit 2600 also includes means for attaching the cooling unit 2600 to the window. In this example, the means for attachment to the window includes at least one anchor hook 2618. The at least one anchor hook 2618 may, for example, be used to hang the cooling unit 2600 from a chain (not shown) or other mechanism in the window. As an alternative, or in conjunction with the anchor hook 2618, cooling unit 2600 also includes at least one suction cup 2620 attached to the flat panel photovoltaic collector 2604 on the second surface 2606 of the flat panel photovoltaic collector 2604. Thus, the suction cup 2620 may attach to an inner surface of the window, and the thermoelectric plate 2607 and fan 2608 will be facing inward into the room to distribute cool air.

In some embodiments, the cooling system includes a housing configured to hold a thermoelectric component and/or at least one fan. FIGS. 27A to 27D illustrate a thermoelectric cooling system 2700 for a cooling system according to some embodiments. Although not shown, the cooling system 2700 may be coupled to a solar collector, such as a flat panel, or non-flat panel, photovoltaic collector as discussed above.

Figure 27A:
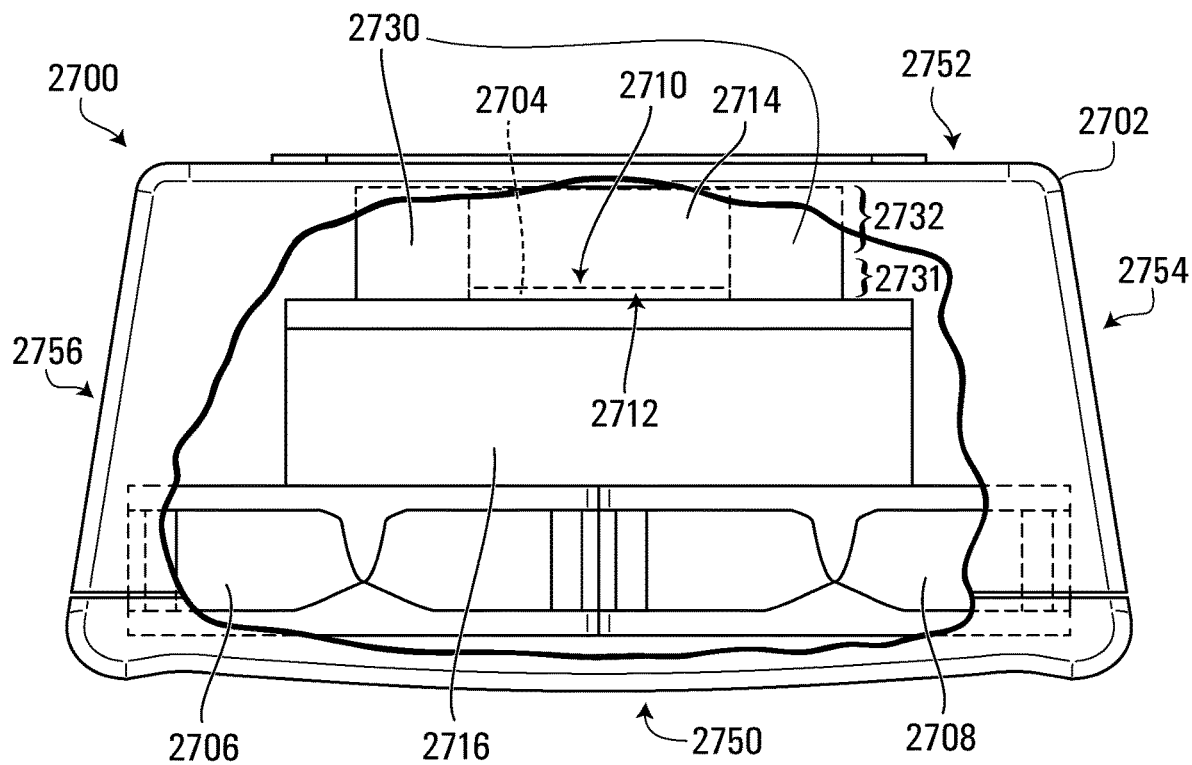
FIG. 27A is a top view of a thermoelectric cooling system 2700 according to some embodiments.

FIG. 27A is a top view of the cooling system 2700, which includes a housing 2702. A portion of the housing 2702 is cutaway in FIG. 27A to show components on the inside of the housing 2702. The cooling system 2700 also includes a thermoelectric component 2704, in this case a Peltier Plate, a first fan 2706 and a second fan 2708. The housing 2702 has a front 2750, a rear 2752, a first side 2754 and a second side 2756 that is opposite the first side 2754. The thermoelectric component 2704 and the first and second fans 2706 and 2708 are all contained by the housing 2702, as will be described in more detail below. The housing 2702 may also include an electrical connecting device for connecting the thermoelectric component 2704 to the electrical output of the photovoltaic cells. Any suitable means for providing electric power from the photovoltaic cells (or an alternative element that generates electricity from solar power) to the thermoelectric component 2704 may be used.

The thermoelectric component 2704 has a hot side 2710 and an opposite cool side 2712. The hot side is arranged to face away from the first and second fans 2706 and 2708 and the cool side 2712 faces towards the first and second fans 2706 and 2708. This embodiment also includes thermal conductor mechanisms for distributing heat and cooling away from the thermoelectric component 2704 (although other embodiments omit such conductors). Specifically, the embodiment shown in FIGS. 27A to 27D the cooling system 2700 includes a first thermal conductor 2714 and a second thermal conductor 2716. The first thermal conductor 2714 abuts the hot side 2710 and is positioned near the rear 2752 of the housing 2702. The first thermal conductor 2714 moves heat away from the thermoelectric component 2704 and toward the rear 2752 of the housing 2702.

The second thermal conductor 2716 abuts the cool side 2712 of the thermoelectric component 2704 to distribute cooling towards the front 2750 of the housing 2702. The first and second fans 2706 and 2708 are adjacent to each other and each partially abut the second thermal conductor 2716 (opposite from the thermoelectric component 2704) near the front 2750 of the housing 2702. Thus, in this embodiment, the second thermal conductor 2716 is positioned between the thermoelectric component 2704 and the first and second fans 2706 and 2708. The thermoelectric component 2704 may cool the second thermal conductor 2716, which in turn (or together with the thermoelectric component 2704) may cool air around the second thermal conductor 2716. This cooled air may then be distributed out from the front 2750 of the housing 2702 by the first and second fans 2706 and 2708.

Figure 27B:
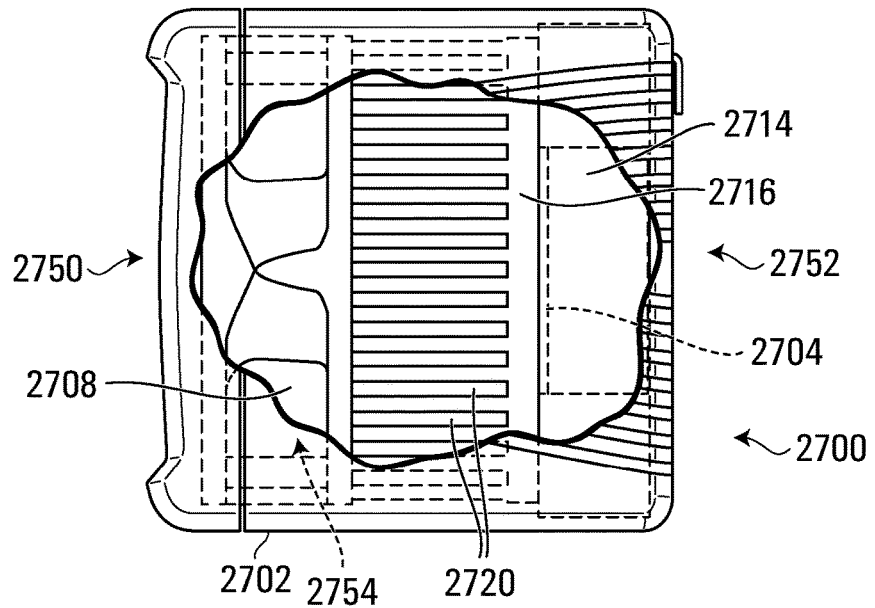
FIG. 27B is a side view of the thermoelectric cooling system of FIG. 27A.

In this specific embodiment, the first thermal conductor 2714 is composed of a solid metal block, and particularly steel. The second thermal conductor 2716 in this embodiment is also metal, particularly aluminum, and includes several metal fins 2720 (as shown in FIG. 27B and discussed below). Air may circulate around the fins 2720 for better cooling of the air.

In other embodiments, the first thermal conductor is not a solid block, and may have a different shape or configuration. For example, the first thermal conductor may include fins or other features. The second thermal conductor may not include fins and may have a different shape or configuration in other embodiments. Other thermally conductive materials, such as copper or non-metals may be used for the first and/or second thermal conductors. The thermal conductors used may be any kind of heat sink, block or configuration (metal or other material) to effectively draw the heat or cooling away from the thermoelectric component.

In some embodiments, a thermally conductive material, such as a thermally conductive paste, may be used to provide a thermally conductive connection between the thermoelectric component and at least one thermal conductor (such as first and second thermal conductors 2714 and 2716).

The cooling system 2700 further includes a gasket 2730 that is arranged to thermally insulate the first thermal conductor 2714 from the second thermal conductor 2716. In FIG. 27A the gasket 2730 at least partially covers sides of the first thermal conductor 2714 and the thermoelectric component 2704. Thus, the first thermal conductor 2714 and the thermoelectric component 2704 are shown in stippled lines. The gasket 2730 may include a front portion 2731 against or near the second thermal conductor 2716 and a rear portion 2732 at least partially around the first thermal conductor 2714. The front portion 2731 of the gasket 2730 may, for example, comprise silicone rubber to insulate heat from the second thermal conductor 2716. The rear portion 2732 of the gasket 2730 may, for example, comprise natural rubber, or "India rubber". The natural rubber may absorb heat and diminish the amount of heat that escapes the cooling system.

The housing 2702 may be composed of a substantially non-thermally conductive or insulating material such as plastic and/or rubber based materials. However, embodiments are not limited to any particular housing material, and other materials such as ceramics or metals may be used to form part or all of the housing 2702.

As will be appreciated, one or both of the first and second thermal conductors 2714 and 2716 may be omitted, as may one or both of the first and second fans 2706 and 2708.

FIG. 27B is a side view of the cooling system 2700 where a part of the first side 2754 is shown cutaway to allow other components inside the housing 2702 to be seen. The thermoelectric component 2704, the second fan 2708, the first thermal conductor 2714 and the second thermal conductor 2716 are visible. FIG. 27B shows the fins 2720 of the second thermal conductor 2716.

Figure 27C:
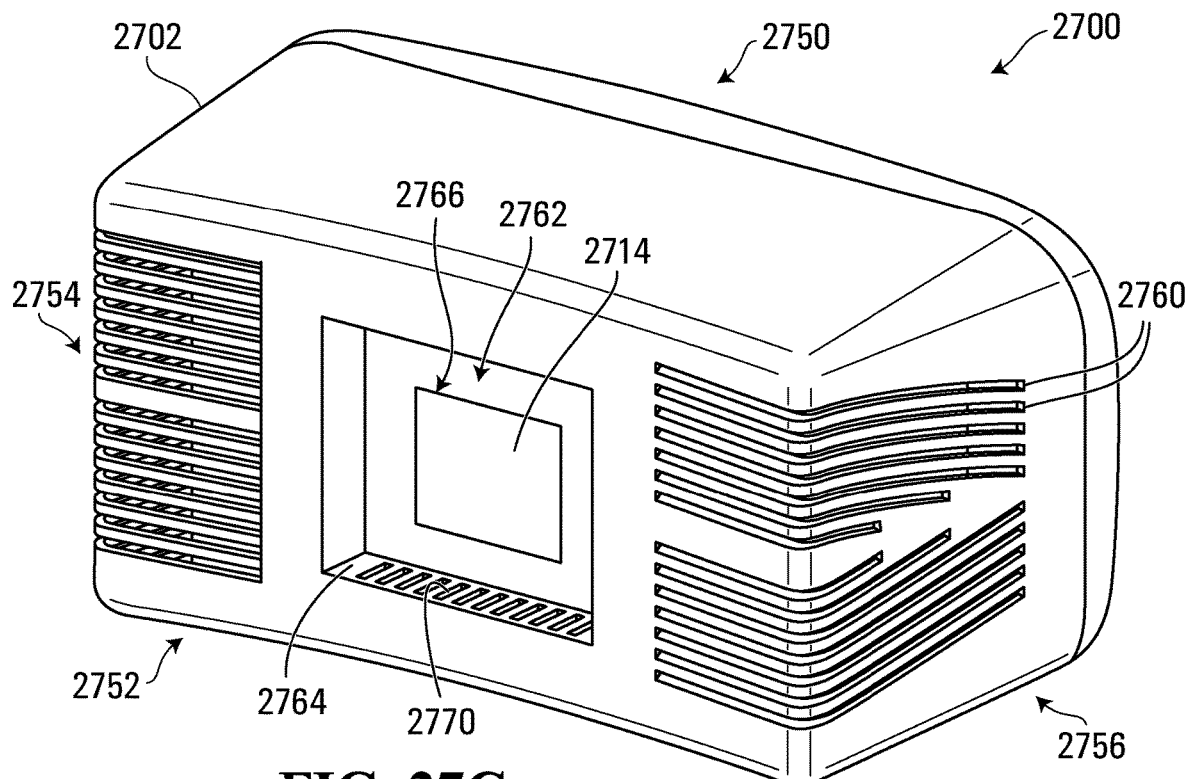
FIG. 27C is a rear perspective view of the thermoelectric cooling system of FIGS. 27A and 27B.

FIG. 27C is a rear perspective view of the cooling system 2700. In this embodiment, several air vents 2760 are located partially along the first and second sides 2754 and 2756 and the rear 2752 of the housing 2702. These vents allow air to enter the housing to be cooled. The inclusion of such vents (as well as the number and position of such vents 2760) is optional. Such vents may ensure the minor heat release is vertical while intake of the air to support cooling is horizontal. Side vents 2760 as shown in FIG. 27C may allow for efficient drawing of outside air to travel into the cooling fins 2720 of the second thermal conductor 2716 and out the front 2750 with the support of the fans 2706 and 2708. The rear 2752 of the housing 2702 includes a generally centered recessed surface 2762. This recessed surface 2762 is surrounded by walls (including bottom wall 2764) that connect it to the rest of the rear 2752 of the housing. An aperture 2766 exposes at least a portion of the first thermal conductor 2714 to allow heat to disperse from the rear 2752 of the housing 2702. The bottom wall 2764 at the bottom of the recessed surface 2762 includes additional air vents 2770 to allow more heat generated by the hot side 2710 of the thermoelectric component 2704 (shown in FIG. 27A) to vent from the housing 2702. The arrangement of the recessed surface 2762, including the additional vents 2770 is optional and is simply provided by way of example. As will be appreciated, the form of the housing 2702 and the arrangement of the components in the housing may vary. Embodiments are not limited to any particular structure and/or arrangement described herein. For example, one or more fans may be located outside of a housing. More or less fans may be used in the same or other locations in or around the housing. The shape of the housing may vary to accommodate more or fewer components or for aesthetic purposes. Other variations are also possible while providing a thermoelectric cooling system that can be part of a cooling system mountable or suspendable in a window (or another vertical surface such as a wall).

Although not shown, the cooling system 2700 may be provided with mechanisms for attaching the cooling system 2700 to a solar collector (not shown), such as a flat panel photovoltaic collector. Such mechanisms could include one or more hooks, brackets, latches, or any other suitable mechanical attachment means. The cooling system 2700 may also be attachable to and removable from a solar collector. The cooling system 2700 is also provided with electrical connection means (not shown) to connect the cooling system 2700 to electrical power output from the solar collector (not shown).

Figure 27D:
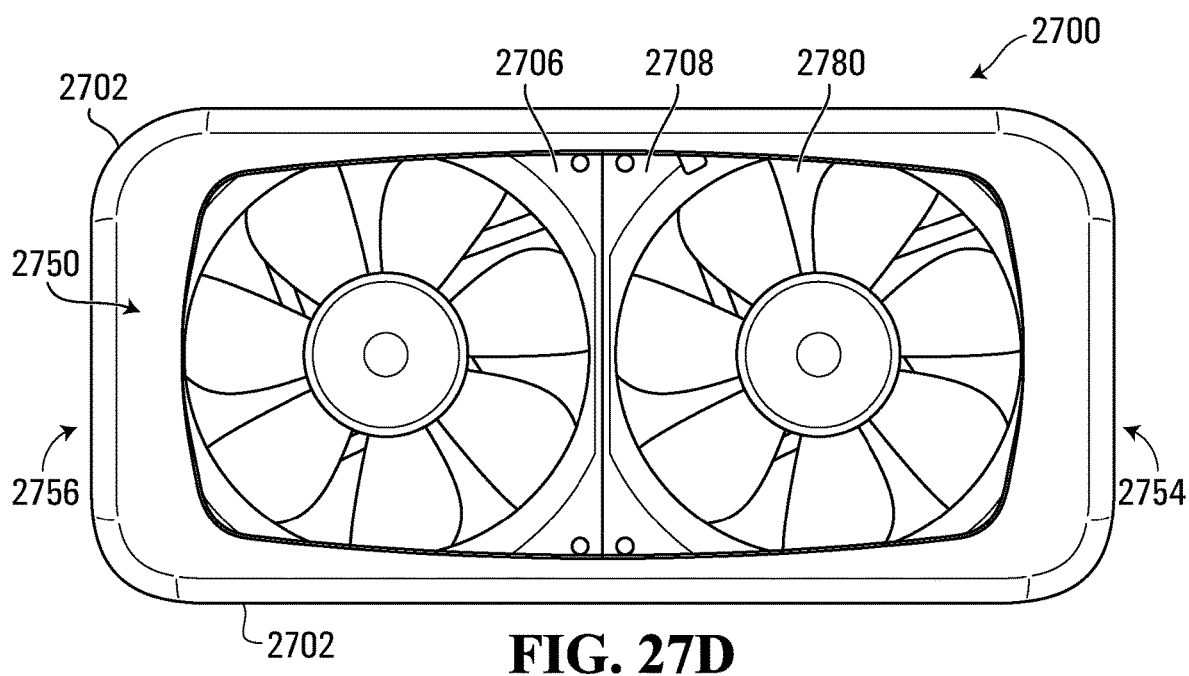
FIG. 27D is a front view of the thermoelectric cooling system of FIGS. 27A, 27B and 27C.

FIG. 27D is a front view of the cooling system 2700. As shown, the example housing 2702 includes a large aperture 2780 in the front 2750 of the housing 2702 that substantially exposes the first and second fans 2706 and 2708. The aperture 2780 allows the fans 2706 and 2708 to push air out of the front 2750 of the housing 2702. Of course, vents, screens or other air permitting structures may be used to allow air from one or more fans to be moved away from the housing 2702.

Figure 28:
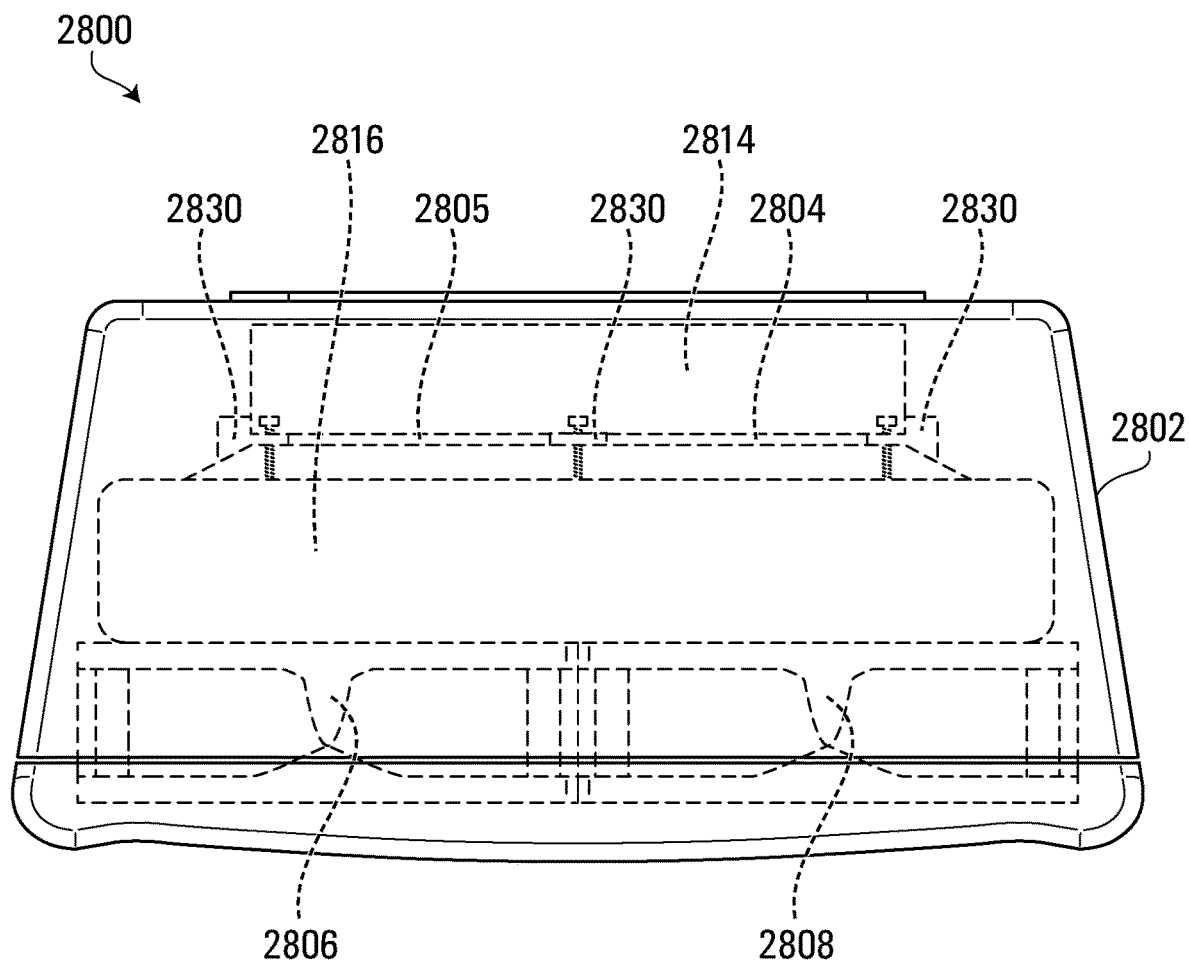
FIG. 28 is a top view of another embodiment of a thermoelectric cooling system.

FIG. 28 is a top view of another embodiment of a thermoelectric cooling system 2800 that may similarly be part of an air cooling system according to some embodiments (possibly attached to a solar collector, such as a panel photovoltaic collector). The system 2800 includes a housing 2802. A portion of the housing 2802 is cutaway in FIG. 27A to show components on the inside of the housing 2802. The cooling system 2800 also includes first and second thermoelectric components 2804 and 2805, a first fan 2806 and a second fan 2808. One or both of the first and second thermoelectric components 2804 and 2805 may be Peltier plates, for example. The cooling system 2800 also includes a first thermal conductor 2814 and a second thermal conductor 2816 that are arranged and functionally similar to the first and second thermal conductors 2714 and 2716 shown in FIG. 27A. Both the first and second thermal conductors 2814 and 2816 are composed of aluminum in this embodiment. The cooling system 2800 also includes rubber gaskets 2830 to thermally insulate the first thermal conductor 2814 from the second thermal conductor 2816.

Figure 29A:
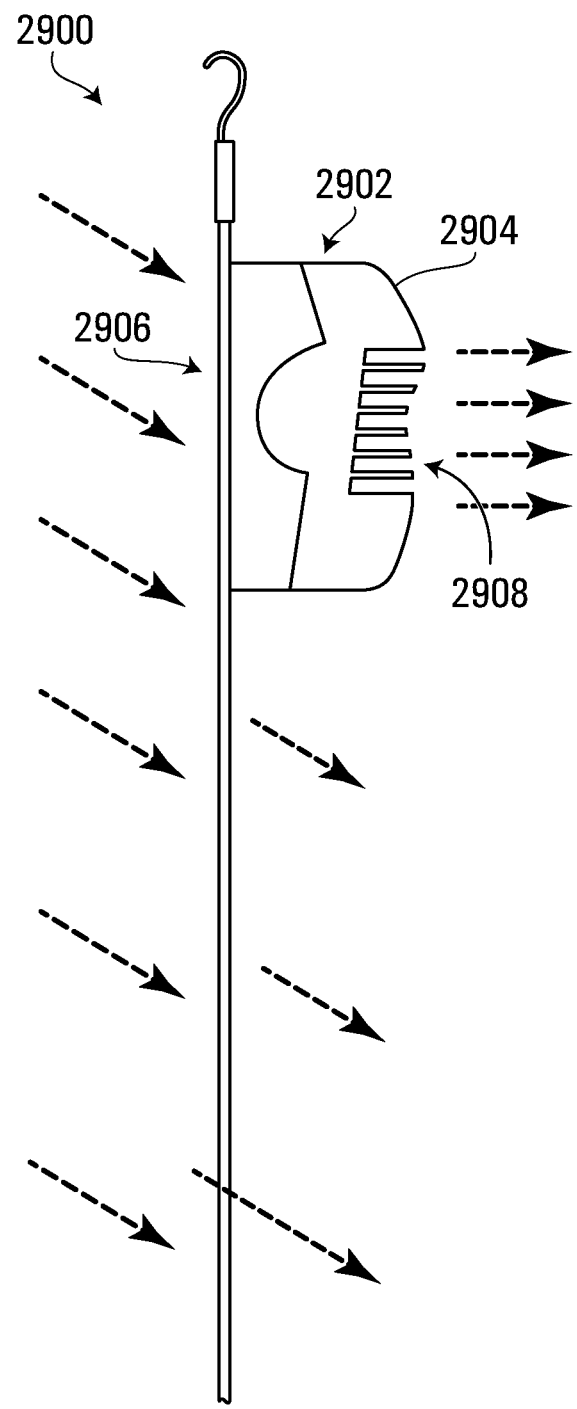
FIG. 29A is a side view of another air cooling system including a thermoelectric cooling system in accordance with some embodiments.
Figure 29B:
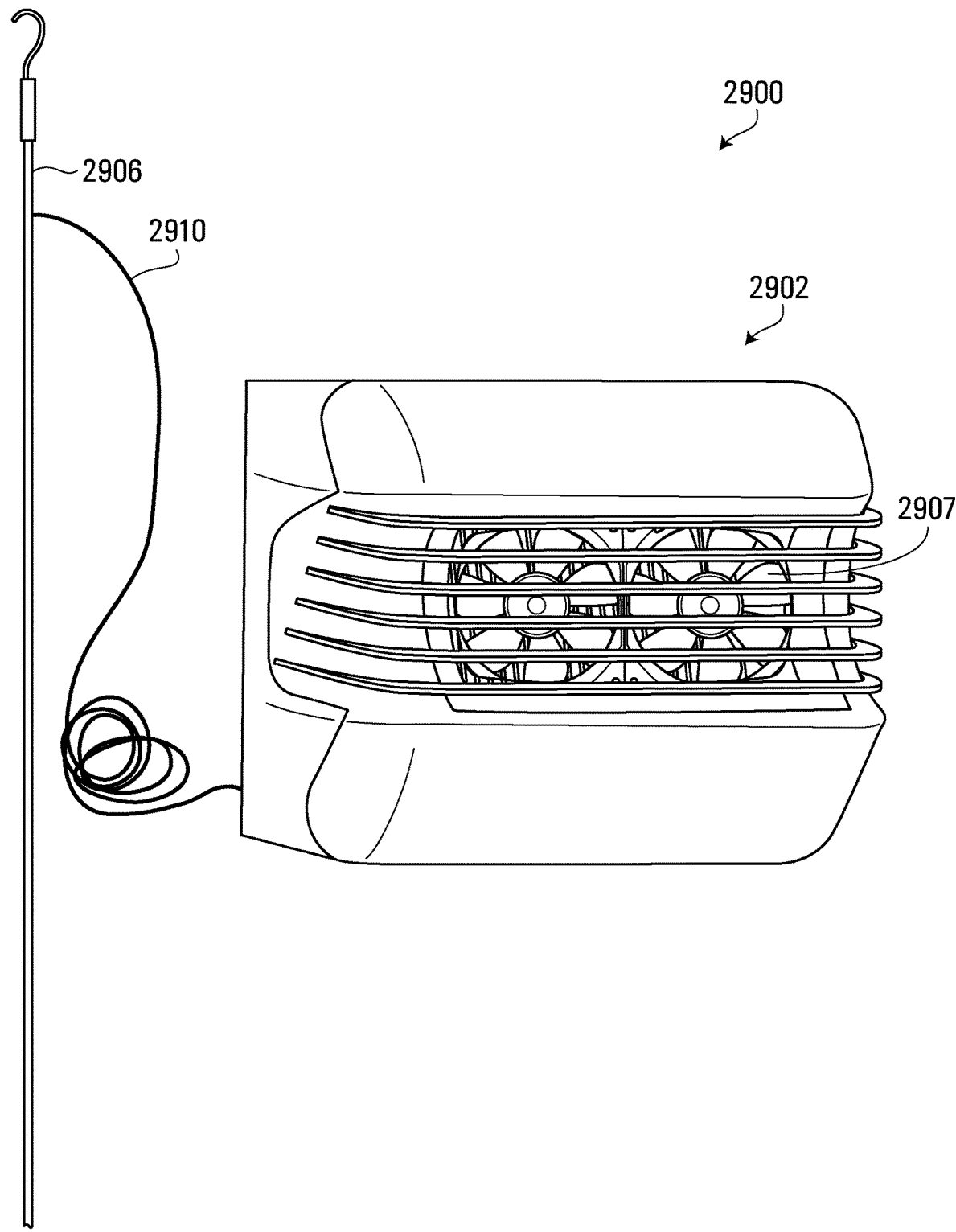
FIG. 29B is a side view of a solar panel and a perspective view of a cooling system of the thermoelectric cooling system of FIG. 29A.

FIGS. 29A to 29B illustrate a yet another embodiment of a solar powered air cooling system 2900 including a thermoelectric cooling system. FIG. 29A is a side view of the air cooling system 2900. The cooling system 2900 includes a thermoelectric cooling system 2902 that is functionally similar to the cooling systems 2700 and 2800 shown in FIGS. 27 and 28. Specifically, the cooling system 2902 having a housing 2904 and including at least one thermoelectric component (not shown), at least one thermal conductor (not shown) to distribute cooling (from the thermoelectric component) toward the front of the cooling system 2902 and/or heat toward the rear of the system. The thermoelectric cooling system 2902 also includes two fans 2907 (shown in FIG. 29B) to distribute air that is cooled by the at least one thermoelectric component and the at least one thermal conductor. The cooling system 2900 also includes a solar panel 2906 that has at least one photovoltaic cell (not shown) and functions similar to the flat panel photovoltaic collector 2550 shown in FIGS. 25A to 25C. Of course, other solar collectors that generate electricity may also be used.

As shown in FIG. 29A, rather than a completely open aperture, the housing 2904 has large vents 2908 to allow air to flow from the housing 2904 by the fans 2907.

In FIG. 29A, the thermoelectric cooling system 2902 is attached directly to the solar panel 2906. However, the thermoelectric cooling system 2902 in this embodiment can be attached to or removed from the solar panel 2906 and still maintain an electric connection with the solar panel 2906 to drive the thermoelectric component and fans 2907. FIG. 29B includes a side view of the solar panel 2906 and a perspective view of the thermoelectric cooling system 2902 of the cooling system 2900. In FIG. 29B, the thermoelectric cooling system 2902 is removed from the solar panel 2906 such that it can be placed in a location different than the solar panel 2906. The cooling system 2902 and the solar panel 2906 are electrically connected by wire 2910. Any suitable mechanical mechanism for mounting or suspending the thermoelectric cooling system 2902 to the solar panel 2906 may be used. For example, hooks, suction cups, brackets, pins, or any combination thereof could be used. Thus, one or both of the thermoelectric cooling system 2902 and the solar panel 2906 may be suspended in this embodiment. Similarly, other systems described herein (such as those shown in FIGS. 24A to 28 and 30) may be configured such that one or both of a cooling element and a solar energy gathering component are suspended (e.g. in a window, on a wall or on another surface). The cooling element and the solar gathering component are not integrated into a single suspendable or mountable unit in all embodiments, but may be located in separate places as described above.

Figure 30:
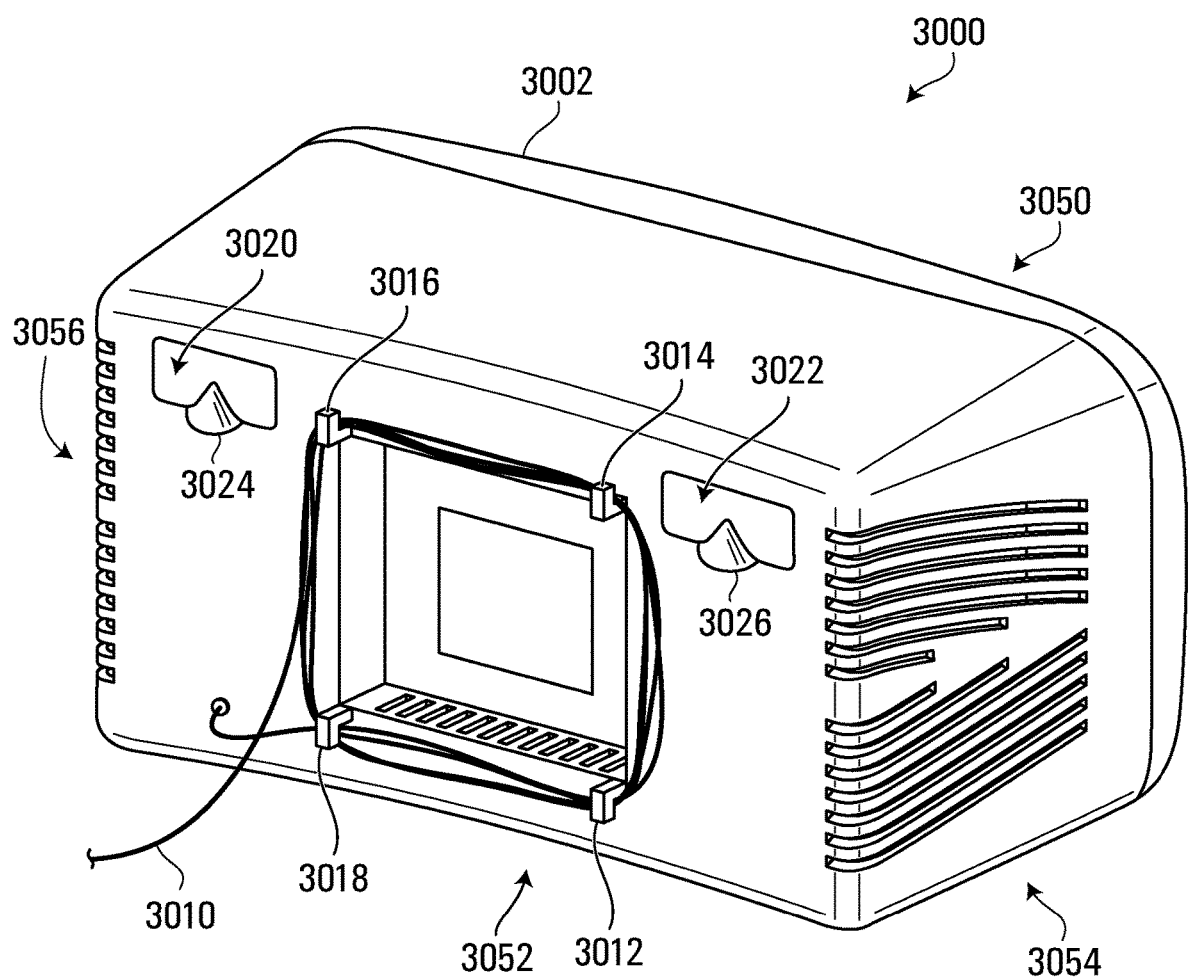
FIG. 30 is a rear perspective view of another embodiment of a thermoelectric cooling system.

FIG. 30 is a rear perspective view of another embodiment of a thermoelectric cooling system 3000 that may similarly be part of an air cooling system, possibly attached to a panel photovoltaic collector designed to be placed in a window or on a wall or other vertically oriented surface. The cooling system 3000 is structurally and functionally similar to the thermoelectric cooling systems 2700 shown in FIGS. 27A to 27D and 28. The cooling system 3000 in FIG. 30 illustrates example mechanisms for attaching and/or electrically connecting the cooling system 3000 to a panel solar collector. These mechanisms described below may be incorporated into other cooling system embodiments described herein. As shown, the cooling system 3000 includes a housing 3002. The housing 3002 has a front 3050, a rear 3052, a first side 3054 and a second side 3056 that is opposite the first side 3054. On the rear 3052 of the housing 3002 is a wire 3010 that is electrically connected to at least one thermoelectric component (not shown) within the housing. The wire 3010 is configured to connect to an electrical output of a solar collector (such as a panel photovoltaic collector). In this example, the housing 3202 also includes four L-shaped extensions 3012, 3014, 3016, 3018 that are configured to allow the wire 3010 to be wrapped around them. Such extensions are not required. The housing 3002 further includes first and second brackets 3020 and 3022 that have first recess 3024 and second recess 3026 respectively. These first and second brackets 3020 and 3022 may be used to hang the cooling system 3000 on complimentary hooks or extensions on the solar collector. The cooling system 3000 is thus removably attachable to a solar collector. The cooling system 3000 may sit in a window (or on another vertical surface such as a wall) with the solar collector when attached, or may sit in another part of the room when detached. Of course other mechanisms to attach or removably attach a cooling system to a solar collector may be used. For example, other configurations may include adhesives, clamps, locks, or any other suitable mechanism.

The thermoelectric cooling systems 2700, 2800, 2902 and 3000 shown in FIGS. 27A to 30 (or variations on these designs) may, in some embodiments, be used without solar generated electricity, but rather with batteries, auto plug-in, home plug-in or other electrical power sources.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

It must be further understood that the simulated and measured results described herein and illustrated in the Figures are provided by way of example only and were made under conditions. Under other actual or simulation conditions, similar or possibly different results may be achieved.

The foregoing description includes many detailed and specific embodiments that are provided by way of example only, and should not be construed as limiting the scope of the present invention. Alterations, modifications and variations may be effected to the particular embodiments by those of skill in the art without departing from the scope of the invention, which is defined solely by the claims appended hereto.

The invention claimed is:

1. An air cooling system comprising:
  a cooling element configured to generate cooling when driven by energy, the cooling element comprising an absorption cooling system that generates cooling through an absorption cooling process driven by heat;
  a solar energy gathering component operatively coupled to the cooling element and configured to absorb solar radiation to generate energy to drive the cooling element to generate cooling, the solar energy gathering component comprising a solar heating component operatively coupled to the cooling element and configured to absorb solar radiation to generate heat to drive the cooling element; and
  an electrical connecting device for connecting the air cooling system to a back-up electrical energy source, wherein the absorption cooling system comprises:

a boiler operatively coupled to the solar heating component and configured to absorb heat generated by the solar heating component to cause refrigerant to vaporize out of a solution of refrigerant and absorbent;
a condenser functionally connected to the boiler and configured to cause the vaporized refrigerant to condense into liquid refrigerant;
an evaporator functionally connected to the condenser and configured to cause the liquid refrigerant from the condenser to evaporate;
an absorber functionally connected between the evaporator and the boiler and configured to absorb the evaporated refrigerant from the evaporator back into the solution of refrigerant and absorbent; and
an electrical heating element operatively coupled to the electrical connecting device and the boiler, wherein the electrical heating element is configured to generate heat to drive the absorption cooling system to generate cooling when driven by the back-up electrical energy source without solar generated energy from the solar heating component,
wherein the cooling element and the solar energy gathering component are integrated to form a cooling unit adapted to be suspended adjacent to an interior-facing side of a window, and
wherein the solar energy gathering component is at least semi-transparent to allow at least some light that has passed through the window to pass through the cooling unit when the cooling unit is suspended in the window.

2. The air cooling system according to claim 1, wherein the absorption cooling system comprises a continuous cycle absorption cooling system.

3. The air cooling system according to claim 1, wherein the solar heating component comprises at least one heating element operatively coupled to the boiler of the absorption cooling system, the at least one heating element being configured to absorb solar radiation and convert the solar radiation to heat to apply to the boiler of the absorption cooling system.

4. The air cooling system according to claim 3, wherein the at least one heating element of the solar heating component comprises at least one heating bar and the boiler of the absorption cooling system comprises at least one circulation tube that extends through an internal portion of the at least one heating bar to circulate the solution of refrigerant and absorbent through the heating bar to heat the solution and cause the refrigerant to vaporize out of the solution.

5. The air cooling system according to claim 4, wherein the heating bar contains thermal fluid surrounding the circulation tube.

6. The air cooling system according to claim 5, wherein the solar heating component further comprises a thermal fluid expansion chamber in fluid communication with the heating bar to permit expansion of the thermal fluid.

7. The air cooling system according to claim 4, wherein the boiler of the absorption cooling system further comprises a backflow column and a percolation tube, wherein the percolation tube is in fluid communication between the circulation tube and the backflow column to permit absorbent to flow back to the backflow column and vaporized refrigerant to flow to the condenser.

8. The air cooling system according to claim 4, wherein the solar heating component further comprises a solar concentrator configured to concentrate solar radiation on the at least one heating bar, the solar concentrator comprising a reflective material that acts as a two-way mirror having a first inner side that is at least semi-transparent and a second outer side that is reflective and configured to reflect solar radiation on the at least one heating bar.

9. The air cooling system according to claim 8, wherein the solar concentrator comprises at least one trough-shaped reflector configured to concentrate solar radiation on the at least one heating bar.

10. The air cooling system according to claim 9, wherein each heating bar is positioned so that it extends along a length of a focal zone of a corresponding trough-shaped reflector of the solar concentrator.

11. The air cooling system according to claim 9, wherein the at least one heating bar and the at least one trough-shaped reflector are arranged horizontally or vertically when in operation.

12. The air cooling system according to claim 9, wherein the at least one trough-shaped reflector has an elliptical and/or parabolic profile.

13. The air cooling system according to claim 12, wherein the at least one trough-shaped reflector includes a lower parabolic curve portion of approximately 100 degrees around a focal point and an upper elliptical curve portion graduated from 101 degrees to 180 degrees.

14. The air cooling system according to claim 8, wherein the at least one heating bar is at least partially constructed of a solar radiation absorbing material to directly convert solar radiation to heat to apply to the boiler of the absorption cooling system.

15. The air cooling system according to claim 1, wherein the solar energy gathering component comprises at least one photovoltaic cell configured to absorb solar radiation and convert the solar radiation to electricity to power at least one electrical heating element operatively coupled to the boiler of the absorption cooling system.

16. The air cooling system according to claim 14, further comprising a fan operatively coupled to the cooling unit, wherein the solar energy gathering component comprises at least one photovoltaic cell configured to absorb solar radiation and convert the solar radiation to electricity to power the fan.

17. The air cooling system according to claim 3, wherein the at least one heating element of the solar heating component comprises a panel solar collector to absorb solar radiation, wherein the panel solar collector is at least semi-transparent.

18. The air cooling system according to claim 17, wherein the boiler of the absorption cooling system comprises at least one circulation tube that extends through an internal portion of the panel solar collector to circulate the solution of refrigerant and absorbent through the panel solar collector to heat the solution and cause the refrigerant to vaporize out of the solution.

19. The air cooling system according to claim 17, wherein the panel solar collector comprises at least one photovoltaic cell configured to absorb solar radiation and convert the solar radiation to electricity to power at least one electrical heating element operatively coupled to the boiler of the absorption cooling system, wherein the at least one photovoltaic cell is at least semi-transparent.

20. The air cooling system according to claim 1, wherein the absorption cooling system is configured such that air is cooled by passing over at least a portion of the evaporator of the absorption cooling system.

21. The air cooling system according to claim 20, further comprising a venting hood partially covering at least a portion of the evaporator and being configured to distribute cooled air from the absorption cooling system that has passed over the evaporator.

22. The air cooling system according to claim 21, wherein the venting hood comprises a plurality of distribution fins positioned such that they are distributed along a length of the evaporator, the plurality of distribution fins being configured to direct distribution of air passing over the evaporator.

23. The air cooling system according to claim 22, wherein the plurality of distribution fins are positioned within the venting hood such that, for each distribution fin, a distance from an interior surface of the venting hood to a lower portion of the distribution fin is greater than a distance from the interior surface of the venting hood to an upper portion of the distribution fin.

24. The air cooling system according to claim 21, wherein the absorption cooling system further comprises at least one fan configured to move air over the evaporator.

25. The air cooling system according to claim 21, further comprising a tray for objects to be cooled by the cooled air distributed by the venting hood.

26. The air cooling system according to claim 25, wherein the tray is integrated with the venting hood by means of a hinged connection to allow the tray to be flipped-up or flipped-down.

27. The air cooling system according to claim 25, further comprising a bin for holding objects to be cooled by the cooled air.

28. The air cooling system according to claim 1, further comprising at least one supporting element operatively coupled to the air cooling system and configured to support the air cooling system in the window.

29. The air cooling system according to claim 1, wherein the refrigerant comprises ammonia and the absorbent comprises water.

30. The air cooling system according to claim 3, wherein the at least one heating element of the solar heating component comprises an evacuated solar collector tube.

31. The air cooling system according to claim 30, wherein the evacuated solar collector tube comprises a heat-conducting rod extending at least partially through an interior of the tube and a heat conducting extension functionally connected to the heat-conducting rod, the at least one heat-conducting rod and heat conducting extension being configured to deliver heat from the tube to the boiler.

32. The air cooling system according to claim 31, wherein at least one of the heat-conducting rod and the heat conducting extension comprises copper.

33. The air cooling system according to claim 1, wherein the back-up electrical energy source comprises a back-up battery.

34. The air cooling system according to claim 1, wherein the back-up electrical energy source comprises an electrical plug-in.

* * * * *